(12) United States Patent
Jia

(10) Patent No.: US 12,141,947 B2
(45) Date of Patent: Nov. 12, 2024

(54) IMAGE PROCESSING METHOD, ELECTRONIC DEVICE, AND COMPUTER-READABLE STORAGE MEDIUM

(71) Applicant: GUANGDONG OPPO MOBILE TELECOMMUNICATIONS CORP., LTD., Dongguan (CN)

(72) Inventor: Yuhu Jia, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 438 days.

(21) Appl. No.: 17/679,949

(22) Filed: Feb. 24, 2022

(65) Prior Publication Data

US 2022/0180484 A1 Jun. 9, 2022

Related U.S. Application Data

(63) Continuation of application No. PCT/CN2019/102794, filed on Aug. 27, 2019.

(51) Int. Cl.
*G06T 5/73* (2024.01)
*G06T 5/20* (2006.01)
(Continued)

(52) U.S. Cl.
CPC ................. *G06T 5/73* (2024.01); *G06T 5/20* (2013.01); *G06T 7/50* (2017.01); *G06T 7/80* (2017.01)

(58) Field of Classification Search
CPC .... G06T 5/73; G06T 5/20; G06T 7/50; G06T 7/80; G06T 2207/10024;
(Continued)

(56) References Cited

U.S. PATENT DOCUMENTS 8,823,813 B2  9/2014  Mantzel
2012/0307084 A1  12/2012  Mantzel
(Continued)

FOREIGN PATENT DOCUMENTS

CN  103402053 A  11/2013
CN  103745474 A  4/2014
(Continued)

OTHER PUBLICATIONS

The European Written Opinion dated Aug. 19, 2022 from European Patent Application No. 19943087.7.
(Continued)

*Primary Examiner* — Chan S Park
*Assistant Examiner* — Daniel C Chang
(74) *Attorney, Agent, or Firm* — Quarles & Brady LLP

(57) ABSTRACT

An image processing method, comprising: converting current posture information of a camera into target posture information; acquiring, in the current posture, first depth information of pixel points in an image to be processed; determining, according to the first depth information, second depth information of the pixel points in a target posture; and obtaining a target image according to the current posture information, the first depth information, the target posture information, the second depth information, and first internal reference information of the camera.

18 Claims, 10 Drawing Sheets

(51) Int. Cl.
*G06T 7/50* (2017.01)
*G06T 7/80* (2017.01)

(58) Field of Classification Search
CPC . G06T 2207/10028; G06T 2207/20201; G06T 5/50; H04N 23/10; H04N 23/65; H04N 23/667; H04N 23/6812; H04N 23/959
See application file for complete search history.

(56) References Cited

U.S. PATENT DOCUMENTS

| | | | |
|---|---|---|---|
| 2014/0176755 A1 | 6/2014 | Narita | |
| 2014/0320681 A1* | 10/2014 | Mantzel | H04N 23/689 348/208.6 |
| 2015/0178900 A1 | 6/2015 | Kim et al. | |
| 2016/0360081 A1 | 12/2016 | Tsubaki et al. | |
| 2019/0045127 A1* | 2/2019 | Takeuchi | H04N 23/667 |
| 2022/0130057 A1* | 4/2022 | Nakamura | G06T 7/262 |

FOREIGN PATENT DOCUMENTS

| | | |
|---|---|---|
| CN | 104880154 A | 9/2015 |
| CN | 106357990 A | 1/2017 |
| CN | 106998459 A | 8/2017 |
| CN | 109005355 A | 12/2018 |
| CN | 109141433 A | 1/2019 |
| CN | 109559271 A | 4/2019 |
| CN | 109561254 A | 4/2019 |
| CN | 109714536 A | 5/2019 |
| CN | 110012219 A | 7/2019 |
| JP | 2014103490 A | 6/2014 |
| JP | 6164679 B2 | 7/2017 |

OTHER PUBLICATIONS

The supplementary European search report dated Aug. 1, 2022 from European Patent Application No. 19943087.7.
The Examination Report dated Mar. 15, 2024 from European patent application No. 19943087.7.
International Search Report and the Written Opinion Dated May 26, 2020 From the International Searching Authority Re. Application No. PCT/CN2019/102794.
The First Office Action dated Feb. 2, 2023 from Chinese patent Application No. 201980096822.5.

* cited by examiner

IMAGE PROCESSING METHOD, ELECTRONIC DEVICE, AND COMPUTER-READABLE STORAGE MEDIUM

CROSS REFERENCE TO RELATED APPLICATIONS

This application is a continuation of International Application No. PCT/CN2019/102794, filed on Aug. 27, 2019. The entire disclosure of this applications is incorporated herein by reference.

BACKGROUND OF DISCLOSURE

Field of the Disclosure

The present disclosure relates to the technical field of image processing, and more specifically to an image processing method and apparatus, electronic device, and storage medium.

Description of the Related Art

With development of imaging technology, people more and more often use image acquisition devices such as cameras on electronic devices to capture images or videos to record various kinds of information. In a process of photographing, due to shaking of an outside world, a picture will be photographed with shake, resulting in motion blur of an image and instability of a video. In order to ensure quality of photographing, it is necessary to perform anti-shake processing during the process of photographing. Traditional anti-shake processing includes optical anti-shake, mechanical anti-shake and electronic anti-shake.

However, most of traditional anti-shake solutions adopt simplified processing, which considers that all objects in the photographed picture are on the same plane, so the anti-shake effect of the photographed picture is unstable.

SUMMARY

Embodiments of the present disclosure provide an image processing method, apparatus, electronic device, and computer-readable storage medium.

An image processing method, including:
acquiring current posture information of a camera;
converting the current posture information into target posture information;
acquiring first depth information of each pixel in an image scheduled for processing in a current posture;
determining second depth information of each pixel in the image scheduled for processing in a target posture according to the target posture information and the first depth information of each pixel in the image scheduled for processing in the current posture; and
acquiring first intrinsic information of the camera and performing re-projection processing on the image scheduled for processing according to the current posture information, the first depth information, the target posture information, the second depth information, and the first intrinsic information to obtain a target image.

An electronic device, including a processor; and a memory configured to store a computer program which, when executed by the processor, causes the processor to:
acquire current posture information of a camera;
convert the current posture information into target posture information;
acquire first depth information of each pixel in an image scheduled for processing in a current posture; and
determine second depth information of each pixel in the image scheduled for processing in a target posture according to the target posture information and the first depth information of each pixel in the image scheduled for processing in the current posture.

A computer-readable storage medium having a computer program stored thereon, the computer program, when executed by a processor, causes the processor to: acquire current posture information of a camera; convert the current posture information into target posture information; acquire first depth information of each pixel in an image scheduled for processing in a current posture; determine second depth information of each pixel in the image scheduled for processing in a target posture according to the target posture information and the first depth information of each pixel in the image scheduled for processing in the current posture; and acquire first intrinsic information of the camera and performing re-projection processing on the image scheduled for processing according to the current posture information, the first depth information, the target posture information, the second depth information, and the first intrinsic information to obtain a target image.

BRIEF DESCRIPTION OF DRAWINGS

In order to more clearly illustrate the embodiments of the present disclosure or the technical solutions in the prior art, accompanying drawings that are used in the description of the embodiments or the prior art will be briefly introduced as follows. Obviously, the drawings in the following description are only some embodiments of the present disclosure. For those of ordinary skill in the art, other drawings can also be obtained based on these drawings without any creative effort.

DETAILED DESCRIPTION OF EMBODIMENTS

In order to make the purpose, technical solutions and advantages of the present disclosure be more clearly understood, the present disclosure will be described in detail below with reference to the accompanying drawings and embodiments. It should be understood that the specific embodiments described herein are only used to explain the present disclosure, but not to limit the present disclosure.

An image processing method and a depth information acquisition method in the embodiments of the present disclosure can be applied to an electronic device. The electronic device may be a computer device with a camera, a personal digital assistant, a tablet computer, a smartphone, a wearable device, or the like.

Figure 1:
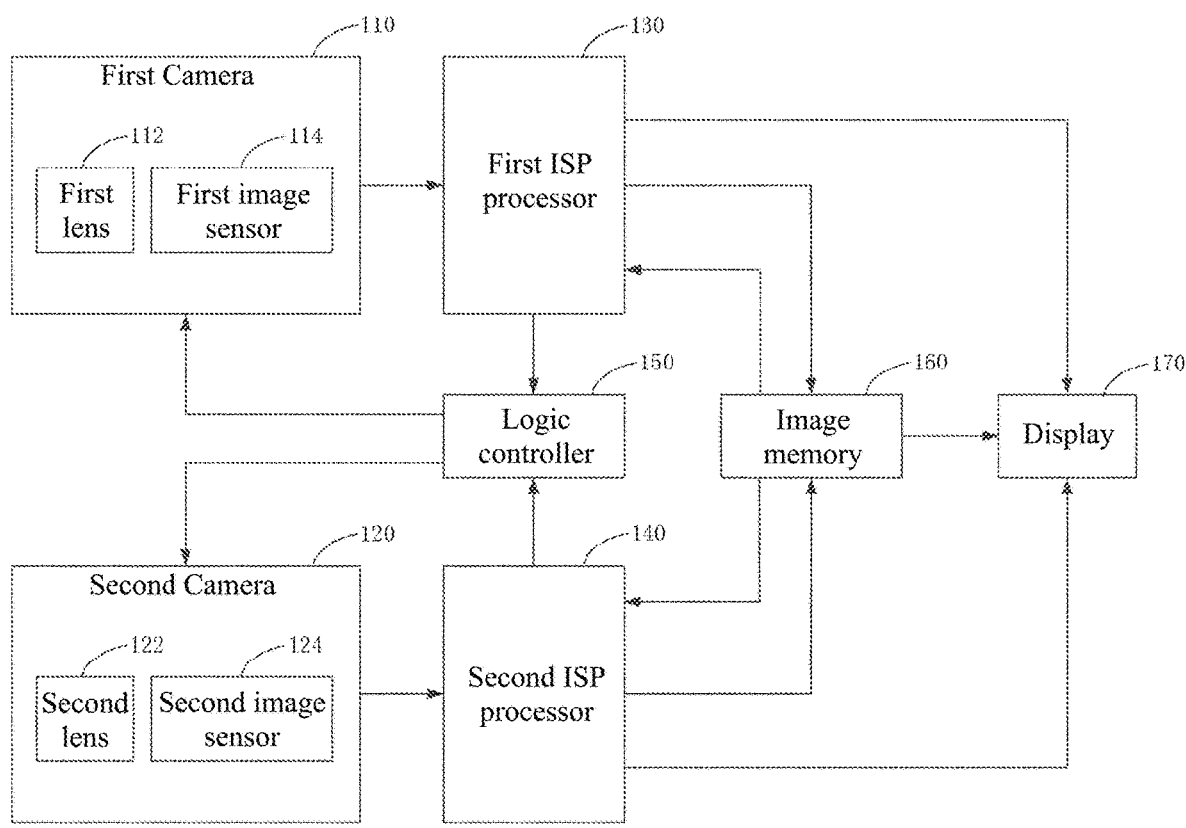
FIG. 1 is a block diagram of an internal structure of an electronic device in one embodiment.

In one embodiment, the above electronic device may include an image processing circuit, which may be implemented by using hardware and/or software components and may include various processing units that define ISP (Image Signal Processing) pipelines. FIG. 1 is a schematic diagram of an image processing circuit in one embodiment. As shown in FIG. 1, for the convenience of description, only various aspects of the image processing technology related to embodiments of the present disclosure are shown.

As shown in FIG. 1, the image processing circuit includes a first ISP processor 130, a second ISP processor 140, and a logic controller 150. The first camera 110 includes one or more first lenses 112 and a first image sensor 114. The first image sensor 114 may include a color filter array (e.g., a Bayer filter), the first image sensor 114 may acquire light intensity and wavelength information captured with each imaging pixel of the first image sensor 114, and provide a set of image data that can be processed by the first ISP processor 130. The second camera 120 includes one or more second lenses 122 and a second image sensor 124. The second image sensor 124 may include a color filter array (e.g., a Bayer filter), the second image sensor 124 may acquire light intensity and wavelength information captured with each imaging pixel of the second image sensor 124, and provide a set of image data that can be processed by the second ISP processor 140.

A first image collected by the first camera 110 is transmitted to the first ISP processor 130 for processing. After the first ISP processor 130 processes the first image, statistical data of the first image (such as brightness of an image, a contrast value of the image, image colors, and the like) to the logic controller 150. The logic controller 150 can determine the control parameters of the first camera 110 according to the statistical data, so that the first camera 110 can perform autofocus, auto-exposure and other operations according to the control parameters. After the first image is processed by the first ISP processor 130, the first image may be stored in an image memory 160, and the first ISP processor 130 may also read the image stored in the image memory 160 for processing. In addition, after the first image is processed by the ISP processor 130, the first image can be directly sent to a display 170 for display, and the display 170 can also read the image in the image memory 160 for display.

The first ISP processor 130 processes the image data, pixel by pixel, in various formats. For example, each image pixel may have a bit depth of 8, 10, 12, or 14 bits, and the first ISP processor 130 may perform one or more image processing operations on image data and collect statistical information about the image data. The image processing operations can be performed with the same or different bit depth precision.

The image memory 160 may be a part of a memory device, a storage device, or an independent dedicated memory within an electronic device, and may include features of a DMA (Direct Memory Access).

Upon data receiving the interface from the first image sensor 114, the first ISP processor 130 may perform one or more image processing operations, such as time-domain filtering. The processed image data may be sent to image memory 160 for additional processing before being displayed. The first ISP processor 130 receives processing data from the image memory 160 and performs image data processing in RGB and YCbCr color spaces on the processed data. The image data processed by the first ISP processor 130 may be output to the display 170 for viewing by a user and/or further processed by a graphics engine or a GPU (Graphics Processing Unit, graphics processor). In addition, an output of the first ISP processor 130 may also be sent to the image memory 160, and the display 170 may read image data from the image memory 160. In one embodiment, image memory 160 may be configured to implement one or more frame buffers.

Statistics data determined by the first ISP processor 130 may be sent to the logic controller 150. For example, the statistics may include statistics of a first image sensor 114 such as auto exposure, auto white balance, autofocus, flicker detection, black level compensation, first lens 112 shading correction, and the like. The logic controller 150 may include a processor and/or a micro-controller executing one or more routines (e.g., firmware) that may determine control parameters of the first camera 110 and the ISP processor 130 based on the received statistical data. For example, the control parameters of the first camera 110 may include gain, integration time for exposure control, anti-shake parameters, flash control parameters, control parameters of the first lens 112 (e.g., focal length value for focusing or zooming), or a combination of these parameters. ISP control parameters may include gain levels and color correction matrices for automatic white balance and color adjustment (e.g., during RGB processing), and shading correction parameters of the first lens 112.

Similarly, a second image captured by the second camera 120 is transmitted to the second ISP processor 140 for processing. After the second ISP processor 140 processes the first image, statistical data of the second image (such as brightness of the image, the contrast value of the image, the color of the image, and the like) are sent to the logic controller 150. The logic controller 150 can determine control parameters of the second camera 120 according to the statistical data, so that the second camera 120 can perform auto-focus, auto-exposure, and other operations according to the control parameters. After the second image is processed by the second ISP processor 140, the second image can be stored in the image memory 160. The second ISP processor 140 can also read the image stored in the image memory 160 for processing. In addition, after the second image is processed by the ISP processor 140, the second image can be directly sent to the display 170 for display. The display 170 can also read the image in the image memory 160 for display. The second camera 120 and the second ISP processor 140 can also implement processing procedures as described for the first camera 110 and the first ISP processor 130.

In one embodiment, the first camera 110 may be a color camera, and the second camera 120 may be a TOF (Time Of Flight) camera or a structured light camera. The TOF camera can obtain a TOF depth map. The structured light camera can obtain the structured light depth map. The first camera 110 and the second camera 120 may both be color cameras. A binocular depth map is acquired by two color cameras. The first ISP processor 130 and the second ISP processor 140 may be the same ISP processor.

When the first camera 110 photographs, the image scheduled for processing can be obtained in a manner of image preview and the image scheduled for processing is sent to the ISP processor. The ISP processor can acquire the current posture information when the camera is photographing; then convert the current posture information into target posture information; acquire first depth information of each pixel in the image scheduled for processing in a current posture, and determine second depth information of each pixel in the image scheduled for processing in the target posture according to the target posture information and the first depth information of each pixel in the image scheduled for processing in the target posture; acquire first intrinsic information of the camera, perform re-projection processing on the image scheduled for processing according to the current posture information, the first depth information, the target posture information, the second depth information, and the first intrinsic information to obtain a target image. By determining accurate depth information of each pixel in the current posture, and converting the accurate depth information in the current posture into the depth information in the target posture, purposeful re-projection processing can be performed on each pixel, improving anti-shake effect for image anti-shake.

Figure 2:
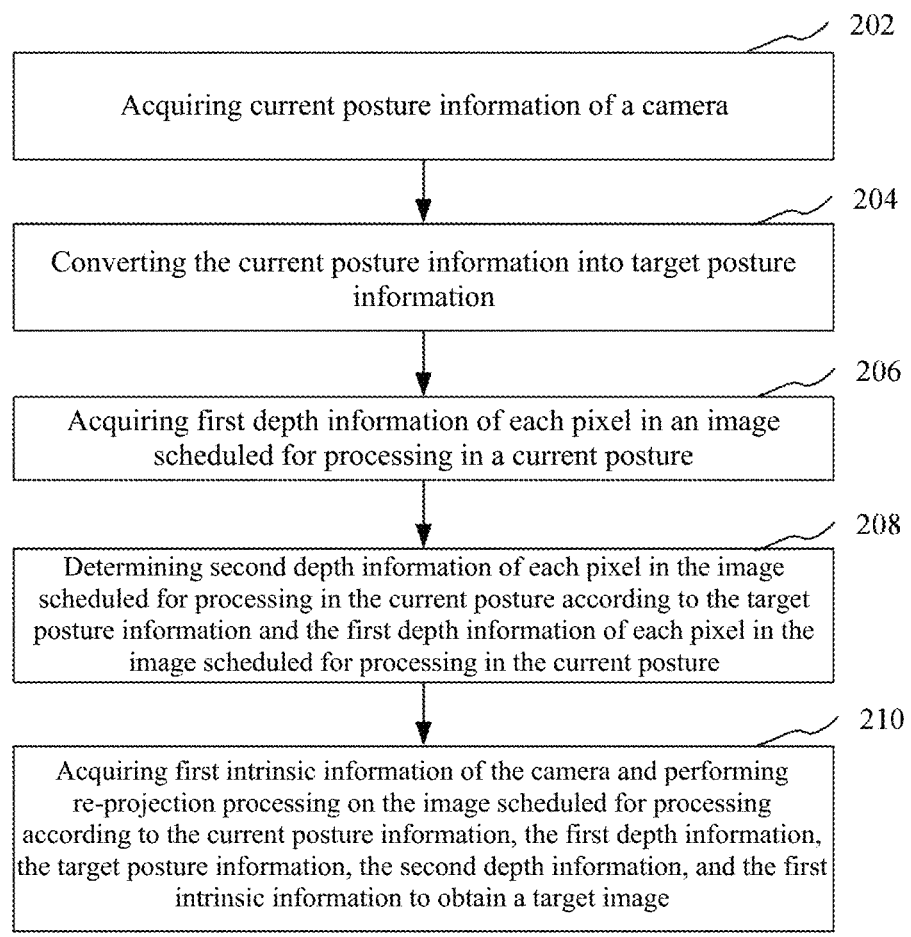
FIG. 2 is a flowchart of an image processing method in one embodiment.

FIG. 2 is a flowchart of an image processing method in one embodiment. The image processing method in this embodiment is described by an example as running in an electronic device in FIG. 1. As shown in FIG. 2, the image processing method includes:

Operation 202: acquiring current posture information of a camera.

The current posture information refers to information representing the current posture of the camera, and the current posture information may include angle posture information, position posture information, and the like. The angle posture information can be represented by a rotation matrix of the camera in the world coordinate system. The position posture information can be represented by a translation matrix of the camera in the world coordinate system. Therefore, the rotation matrix and the translation matrix can be used to represent the current posture information of the camera.

Specifically, an ISP processor or a central processing unit of an electronic device may acquire the angle posture information and the position posture information of the camera. The ISP processor or the central processing unit of the electronic device can detect the angular velocity of the camera in the current posture, and obtain angular posture information by a relationship between angular velocity and time. The position posture information can be obtained by detecting the acceleration of the camera in the current posture and the relationship between the acceleration and time.

Operation 204: converting the current posture information into target posture information.

Target posture refers to the posture of the camera when the image scheduled for processing that is photographed in the current posture is in a stable state after re-projection is performed. The target posture information refers to information that can represent the target posture.

Specifically, after the ISP processor or the central processing unit of the electronic device obtains the current posture information of the camera, a prediction can be performed according to the current posture to determine the target posture corresponding to the current posture. Further, the current posture information can be converted into target posture information by a target posture prediction algorithm.

Operation 206: acquiring first depth information of each pixel in an image scheduled for processing in a current posture.

The first depth information refers to accurate depth information corresponding to each pixel in the image scheduled for processing in the current posture.

Specifically, the ISP processor or the central processing unit of the electronic device may acquire the first depth information corresponding to each pixel in the image scheduled for processing in the current posture.

In this embodiment, the image scheduled for processing may be a complete image or a partial image in an image.

Operation 208: determining second depth information of each pixel in the image scheduled for processing in the current posture according to the target posture information and the first depth information of each pixel in the image scheduled for processing in the current posture.

The second depth information refers to the depth information corresponding to each pixel of the image scheduled for processing in the target posture.

Specifically, after the ISP processor or the central processing unit of the electronic device converts the current posture information into the target posture information, the target posture corresponding to the current posture is obtained. According to the current posture and the target posture, the first depth information of each pixel in the image scheduled for processing in the current posture can be transformed into the second depth information of each pixel in the image scheduled for processing in the target posture through coordinate transformation.

Operation 210: acquiring first intrinsic information of the camera and performing re-projection processing on the image scheduled for processing according to the current posture information, the first depth information, the target posture information, the second depth information, and the first intrinsic information to obtain a target image.

The first intrinsic information refers to real-time intrinsic information of the camera acquired in the current posture.

Specifically, the ISP processor or the central processing unit of the electronic device may acquire the first intrinsic information of the camera in the current posture. Next, the current posture information, the first depth information, the target posture information, the second depth information, and the first intrinsic information are inputted into a re-projection mapping algorithm, and a re-projected pixel coordinate of each pixel of the image scheduled for processing can be obtained. The target image can be obtained by outputting an image according to the re-projected pixel coordinate of each pixel of the image scheduled for processing.

The image processing method and apparatus, electronic device, and computer-readable storage medium in the present embodiment are used for acquiring current posture information of a camera, converting the current posture information into target posture information, acquiring first depth information of each pixel in an image scheduled for processing in a current posture, determining second depth information of each pixel in the image scheduled for processing in a target posture according to the target posture information and the first depth information of each pixel in the image scheduled for processing in the current posture, acquiring first intrinsic information of the camera and performing re-projection processing on the image scheduled for processing according to the current posture information, the first depth information, the target posture information, the second depth information, and the first intrinsic information to obtain a target image. Thus, purposeful anti-shaking for each pixel can be achieved, making the anti-shake effect of photographing more stable.

Figure 3:
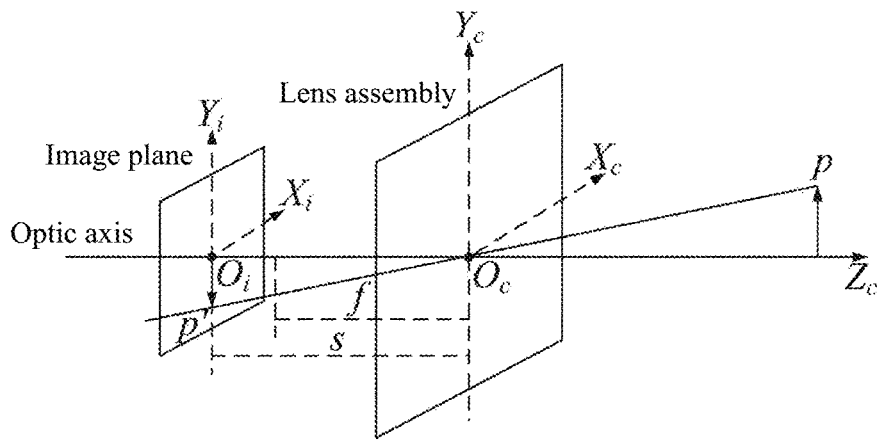
FIG. 3 is a schematic diagram of pinhole imaging in one embodiment.

As shown in FIG. 3, that is a schematic diagram of pinhole imaging in one embodiment.

In which f is a focal length of the camera, $c_x$ and $c_y$ is central coordinate offsets of the camera, K is an intrinsic matrix of the camera including parameters f, $c_x$, and $c_y$, (x, y, z) is the coordinate of a point p in a three-dimensional space in a world coordinate system, (u, v) is the pixel coordinate of a pixel p' of p, R and T are a rotation matrix and a translation matrix of the camera in the world coordinate system representing the current posture information of the camera, and $z_c$ is an object distance of a point p in the three-dimensional space in a camera coordinate system. In different camera postures, the camera coordinate system will change, and $z_c$ will also change.

A mapping relationship between a point in the three-dimensional space and image pixel coordinate in an imaging process is shown as formula (1):

$$Z_c \begin{bmatrix} u \\ v \\ 1 \end{bmatrix} = \begin{bmatrix} f & 0 & c_x \\ 0 & f & c_y \\ 0 & 0 & 1 \end{bmatrix} \begin{bmatrix} R & T \\ 0 & 1 \end{bmatrix} \begin{bmatrix} x \\ y \\ z \end{bmatrix} = K \begin{bmatrix} R & T \\ 0 & 1 \end{bmatrix} \begin{bmatrix} x \\ y \\ z \end{bmatrix} \quad (1)$$

In order to obtain a stable output image, the image scheduled for processing in the current posture can be re-projected to the posture with the camera posture being R' and T' (i.e., the target posture), and then a corresponding $Z'_c$ can be calculated according to the target posture, that is, the re-projection process can be described as:

$$\begin{bmatrix} u \\ v \\ 1 \end{bmatrix} = \frac{Z'_c}{Z_c} K \begin{bmatrix} R' & T' \\ 0 & 1 \end{bmatrix} \begin{bmatrix} R & T \\ 0 & 1 \end{bmatrix}^{-1} K^{-1} \begin{bmatrix} u' \\ v' \\ 1 \end{bmatrix} \quad (2)$$

Figure 4:
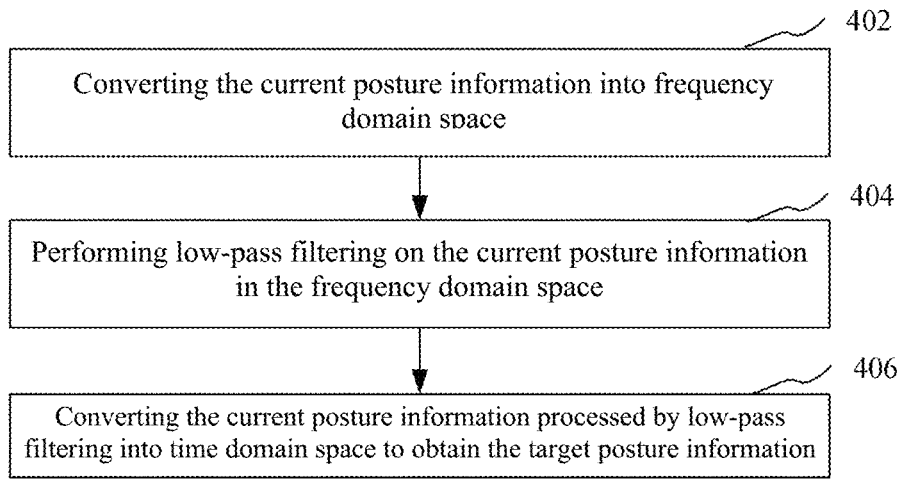
FIG. 4 is a flowchart of an operation of converting current posture information into target posture information in one embodiment.

In one embodiment, as shown in FIG. 4, the converting the current posture information into the target posture information includes:

Operation 402: converting the current posture information into frequency domain space.

The time domain refers to a temporal domain, which describes the relationship between mathematical functions or physical signals to time. For example, the time domain waveform of a signal can express the change of the signal over time. The frequency domain refers to a domain of frequencies. An independent variable of the frequency domain is a frequency, that is, a horizontal axis is a frequency, and a vertical axis is amplitude of a signal at the frequency, that is, a spectrogram. The spectrogram describes a frequency structure of a signal and a relationship between a frequency and amplitude of a signal at the frequency.

Specifically, the ISP processor or the central processing unit acquires angular velocity information by a gyroscope and acquires acceleration information by an accelerometer. The angular velocity and acceleration are converted into the current posture information by performing an integral on the angular velocity information and acceleration information in the time domain. Then, the ISP processor or the central processing unit can convert the current posture information in the time domain space to the frequency domain space.

Operation 404: performing low-pass filtering on the current posture information in the frequency domain space.

Specifically, the ISP processor or the central processing unit performs low-pass filtering on the current posture information to remove high-frequency components in the current posture information and retain low-frequency components in the current posture information.

Operation 406: converting the current posture information processed by low-pass filtering into time domain space to obtain the target posture information.

Specifically, the ISP processor or the central processing unit then converts the current posture information processed by low-pass filtering into the time domain space, wherein the posture information obtained after the information processed by low-pass filtering is converted from the frequency domain space to the time domain space is the target posture information.

The image processing method in this embodiment converts the current posture information into the frequency domain space, make energy of the image scheduled for processing be mainly concentrated in the low frequency, and performs the low-pass filtering on the current posture information in the frequency domain space, that can remove the high-frequency components and retain the low-frequency components, thereby retaining key information in the image scheduled for processing and making information of the image scheduled for processing more intuitive. The current posture information processed by low-pass filtering is converted into the time domain space to obtain the target posture information. The current posture information can be accurately converted into the target posture information, so that the posture of the image scheduled for processing in a stable state, that is, the target posture, can be predicted.

Figure 5:
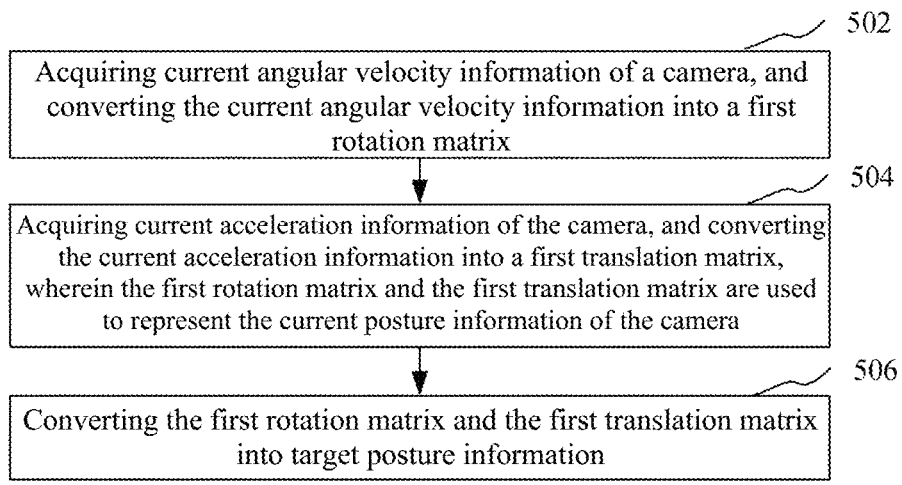
FIG. 5 is a flowchart of an operation of acquiring current posture information of a camera in one embodiment.

In one embodiment, as shown in FIG. 5, the acquiring the current posture information of the camera includes:

Operation 502: acquiring current angular velocity information of the camera, and converting the current angular velocity information into a first rotation matrix.

Specifically, the ISP processor or the central processing unit of the electronic device outputs the tri-axial angular velocity by the gyroscope, and performs the components of each axis in the time dimension in an integral manner to obtain tri-axial angular velocity information. Next, a rotation angle of each axis may be converted into a first rotation matrix by using a left-handed coordinate system or a right-handed coordinate system.

Operation 504: acquiring current acceleration information of the camera, and converting the current acceleration information into a first translation matrix, wherein the first rotation matrix and the first translation matrix are used to represent the current posture information of the camera.

Specifically, the ISP processor or the central processing unit of the electronic device outputs the tri-axial acceleration by the accelerometer, and performs the components of each axis in the time dimension in an integral manner to obtain tri-axial acceleration information. Next, the rotation angle of each axis may be converted into a first rotation matrix by using a left-handed coordinate system or a right-handed coordinate system. It can be understood that the first rotation matrix and the first translation matrix are respectively obtained by converting the angular velocity information and the acceleration information in one of the left-handed coordinate system or the right-handed coordinate system. The first rotation matrix and the first translation matrix are used to represent the current posture information of the camera.

The converting the current posture information into the target posture information includes:

Operation 506: converting the first rotation matrix and the first translation matrix into the target posture information.

Specifically, the ISP processor or the central processing unit of the electronic device can convert the first rotation matrix in the current posture into the rotation matrix in the target posture, and convert the first translation matrix in the current posture into the translation matrix in the target posture, wherein the rotation matrix and the translation matrix in the target posture can be used to represent the target posture information.

The image processing method in this embodiment acquires the current angular velocity information of the camera, converts the current angular velocity information into the first rotation matrix, acquires the current acceleration information of the camera, and converts the current acceleration information into the first translation matrix, wherein the first rotation matrix and the first translation matrix are used to represent the current posture information of the camera, and converts the first rotation matrix and the first translation matrix into the target posture information, so that the target posture information of the camera can be predicted according to the current posture information of the camera.

Figure 6:
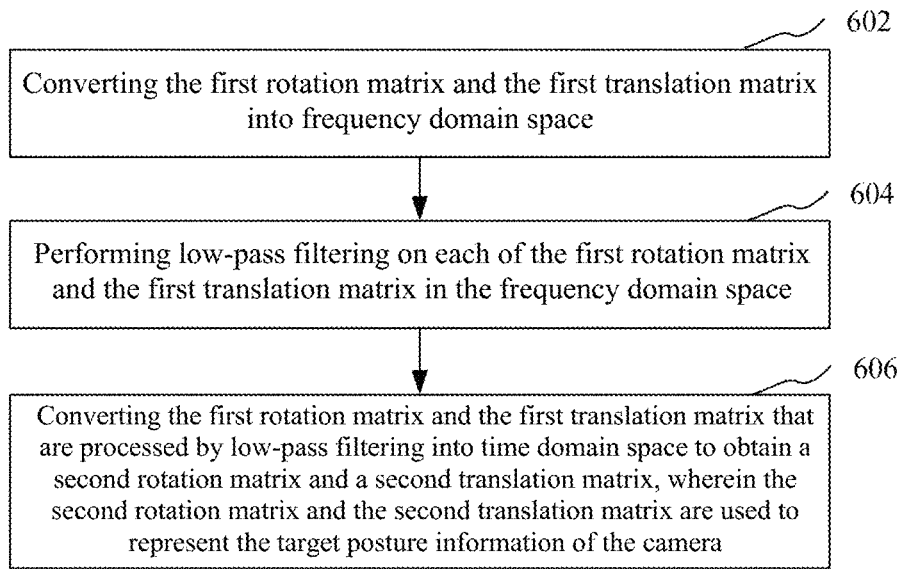
FIG. 6 is a flowchart of an operation of converting a first rotation matrix and a first translation matrix into target posture information in one embodiment.

In one embodiment, as shown in FIG. 6, the converting the first rotation matrix and the first translation matrix into the target posture information includes:

Operation 602: converting the first rotation matrix and the first translation matrix into frequency domain space.

Specifically, the ISP processor or central processing unit of the electronic device performs an integral on the current tri-axial angular velocity and tri-axial acceleration of the camera in time domain to obtain corresponding tri-axial angular velocity information and tri-axial acceleration information, and converts the tri-axial angular velocity information and the three-axis acceleration information into the first rotation matrix and the first translation matrix in the time domain space. Next, the ISP processor or the central processing unit of the electronic device converts the first rotation matrix and the first translation matrix in the time domain space into the frequency domain space to obtain the first rotation matrix and the first translation matrix in the frequency domain space.

Operation 604: performing low-pass filtering on each of the first rotation matrix and the first translation matrix in the frequency domain space.

Specifically, the ISP processor or the central processing unit of the electronic device processes the first rotation matrix in the frequency domain space by low-pass filtering to remove the high-frequency components and retain the low-frequency components, so as to obtain the first rotation matrix of the low-frequency components in the frequency domain space. Similarly, the first translation matrix in the frequency domain space is processed by low-pass filtering to remove the high-frequency components and retain the low-frequency components to obtain the first translation matrix of low-frequency components in the frequency domain space.

Operation 606: converting the first rotation matrix and the first translation matrix, that are processed by low-pass filtering, into time domain space to obtain a second rotation matrix and a second translation matrix, wherein the second rotation matrix and the second translation matrix are used to represent the target posture information of the camera.

Specifically, the ISP processor or the central processing unit of the electronic device converts the first rotation matrix and the first translation matrix of the low-frequency components in the frequency domain space into the time domain space to obtain the second rotation matrix and the first translation matrix in the time domain space, wherein the second rotation matrix and the second translation matrix are used to represent the target posture information of the camera.

In this embodiment, the ISP processor or the central processing unit of the electronic device can convert the first rotation matrix and the first translation matrix in the time domain space into the frequency domain space by using Fourier transform algorithm, discrete transform algorithm, and other algorithms, and then convert the first rotation matrix and the first translation matrix of the low-frequency components in the frequency domain space into the time domain space by using the Fourier transform algorithm, discrete transform algorithm, and other algorithms to obtain the target posture information.

The image processing method in this embodiment converts the first rotation matrix and the first translation matrix in the time domain space into the frequency domain space, so that more detailed information of the image scheduled for processing can be obtained, and the first rotation matrix and the first translation matrix in the frequency domain are processed by low-pass filtering, which can retain key information of the image, remove unnecessary information, and make the image information more intuitive. The first rotation matrix and the first translation matrix, that are processed by the low-pass filter, are converted into the time domain space to obtain the second rotation matrix and the second translation matrix, wherein the second rotation matrix and the second translation matrix are used to represent the target posture information of the camera, to obtain the posture information of the camera when the image scheduled for processing is stable, that is, the target posture information.

Figure 7:
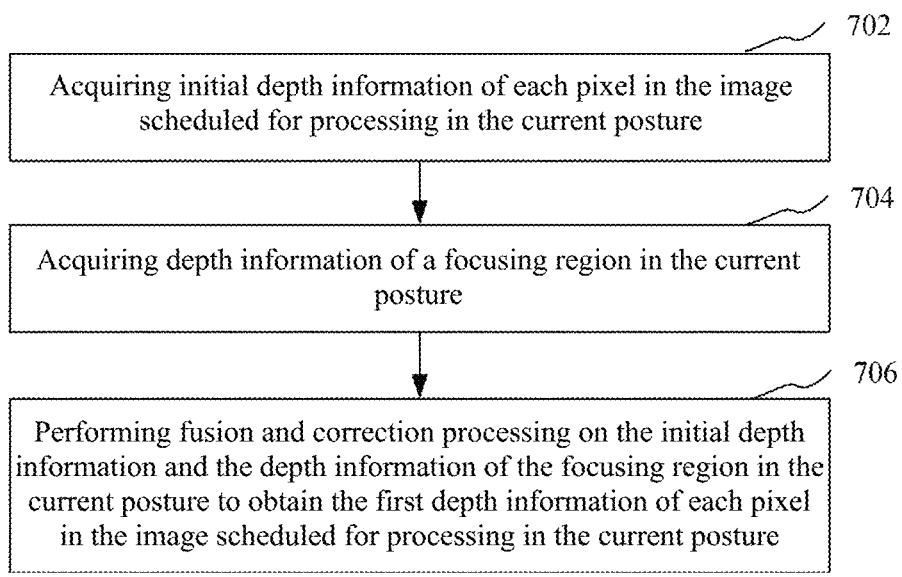
FIG. 7 is a flowchart of an operation of acquiring first depth information of each pixel in an image scheduled for processing in a current posture in one embodiment.

In one embodiment, as shown in FIG. 7, the acquiring the first depth information of each pixel in the image scheduled for processing in the current posture includes:

Operation 702: acquiring initial depth information of each pixel in the image scheduled for processing in the current posture.

The initial depth information refers to the depth information of the image scheduled for processing that is directly obtained by a depth camera.

Specifically, the ISP processor or the central processing unit of the electronic device can use the depth camera to photograph the image scheduled for processing of the same scene in the current posture, and can directly obtain the initial depth information of each pixel in the image scheduled for processing.

In this embodiment, the depth camera may be a TOF camera, a dual-camera camera, a structured light camera, or the like. The ISP processor or central processing unit of the electronic device can directly capture the image scheduled for processing in the current posture through image acquisition equipment such as a TOF camera, a dual-camera camera, and a structured light camera. No other conversion processing is required, and depth information of each pixel in the image scheduled for processing can be obtained simply and quickly, thereby improving the speed of image processing.

In this embodiment, an initial image can be collected by the TOF camera, and a low-resolution area in the initial image can be interpolated, or the entire initial image can be interpolated, so as to obtain an image scheduled for processing with a resolution higher than the initial image. Interpolation processing methods include, but are not limited to, a bi-square interpolation method and a bicubic interpolation method.

Operation 704: acquiring depth information of a focusing region in the current posture.

Specifically, the ISP processor or the central processing unit of the electronic device can determine the same scene that is currently photographed, and after optical focusing is performed by a motor-driven lens, a focusing position (i.e., the focusing region) in the current posture can be determined, which can be used to obtain the depth information corresponding to each pixel in the focusing region in the current posture according to a corresponding relationship between a focus position and a focal length value, and a pair-mapping relationship between a focal length value and depth information, that are predetermined.

Operation 706: performing fusion and correction processing on the initial depth information and the depth information of the focusing region in the current posture to obtain the first depth information of each pixel in the image scheduled for processing in the current posture.

The fusion and correction processing means that different information of the same image scheduled for processing obtained in different ways is analyzed and selected, so as to fuse different information obtained in different ways into the same image. The first depth information refers to the depth information with higher precision of each pixel in the image scheduled for processing in the current posture.

Specifically, the accuracy of the depth information of the image scheduled for processing that is directly obtained by the depth camera is not as high as the accuracy of the depth information obtained during optical focusing. Namely, the accuracy of the initial depth information of each pixel in the image scheduled for processing in the current posture obtained by the depth camera is lower than the accuracy of the depth information of the focusing region in the current posture after optical focusing. Then the ISP processor or the central processing unit of the electronic device can fuse and superimpose the depth information of the focusing region in the current posture and the depth information of the image scheduled for processing directly photographed by the depth camera, so that the depth information of each pixel in the image scheduled for processing in the current posture can reach the accuracy of the depth information of the focusing region, so as to obtain the first depth information of each pixel in the image scheduled for processing in the current posture.

In the image processing method in this embodiment, by acquiring the initial depth information of each pixel in the image scheduled for processing in the current posture, and acquiring the depth information of the focusing region in the current posture, two types of depth information with different precision of the same image scheduled for processing in the current posture can be obtained. The fusion and correction processing can be performed on the initial depth information and the depth information of the focusing region in the current posture to obtain the first depth information of each pixel in the image scheduled for processing in the current posture. Local depth information with high precision can be applied to each part of the image scheduled for processing, thereby obtaining more accurate depth information of the image scheduled for processing, that is, the first depth information of each pixel in the image scheduled for processing in the current posture is obtained.

In one embodiment, the acquiring depth information of the focusing region in the current posture includes:

determining the focusing region in the current posture, and acquiring a corresponding focal length value according to the focusing region; acquiring corresponding depth information according to the focal length value, and using the depth information corresponding to the focal length value as the depth information of the focusing region in the current posture.

The focusing region is a focus position after the motor drives the lens to focus.

Specifically, the ISP processor or the central processing unit of the electronic device can determine the current focus position of the motor-driven lens that is focused, and acquire the focal length value corresponding to the focusing region in the current posture according to a preset correspondence between the focusing region and the focal length value. The focal length value corresponding to the focusing region in the current posture is the focal length value of the lens in the current posture. Next, by using a preset correspondence between the focal length value of the lens and the depth information, the depth information corresponding to the focal length value of the lens in the current posture is acquired, and the depth information corresponding to the focal length value of the lens in the current posture is used as the depth information for the focusing region in the current posture.

The image processing method in this embodiment can obtain the focal length value corresponding to the focusing region in the current posture according to the preset correspondence between the focusing region and the focal length value, and obtain the depth information corresponding to the focal length value of the lens in the current posture according to the preset correspondence between the focal length value and the depth information, thereby indirectly obtaining the depth information corresponding to the focusing region in the current posture.

In one embodiment, the obtaining the corresponding focal length value according to the focusing region includes:

acquiring the mapping relationship between the focusing region and the focal length value, and acquiring the focal length value corresponding to the focusing region according to the mapping relationship.

Specifically, the mapping relationship between the focusing region and the focal length value is preset. The ISP processor or the central processing unit of the electronic device may acquire the mapping relationship, and determine the same focusing region as the focusing region in the current posture from the mapping relationship. In addition, the focal length value corresponding to the same focusing region in the mapping relationship is acquired, and then the focal length value is a focal length value corresponding to the focusing region in the current posture, so that the focal length value corresponding to the focus area in the current posture can be quickly obtained by the preset mapping relationship between the focus area and the focal length value.

In one embodiment, the acquiring the corresponding focal length value according to the focusing region includes:

acquiring a relational mapping table, and acquiring the focal length value corresponding to the focusing region from the relational mapping table, wherein the mapping relationship between the focusing region and the focal length value is recorded in the relational mapping table.

The relationship mapping table is a preset table of correspondence between focusing regions and focus values, and is used to record the mapping relationship between focusing regions and focus distance values.

Specifically, the ISP processor or the central processing unit of the electronic device can acquire the relationship mapping table, compare the focusing region in the current posture with the focusing region in the relationship mapping table one by one, and determine the focusing region in the relational mapping table that is the same as the focusing region in the current posture. Next, the focal length value corresponding to the same focusing region in the relational mapping table can be acquired, and then the focal length value is a focal length value corresponding to the focusing region in the current posture. The focal length value corresponding to the focusing region in the current posture can be obtained quickly and simply by the relational mapping table.

Figure 8:
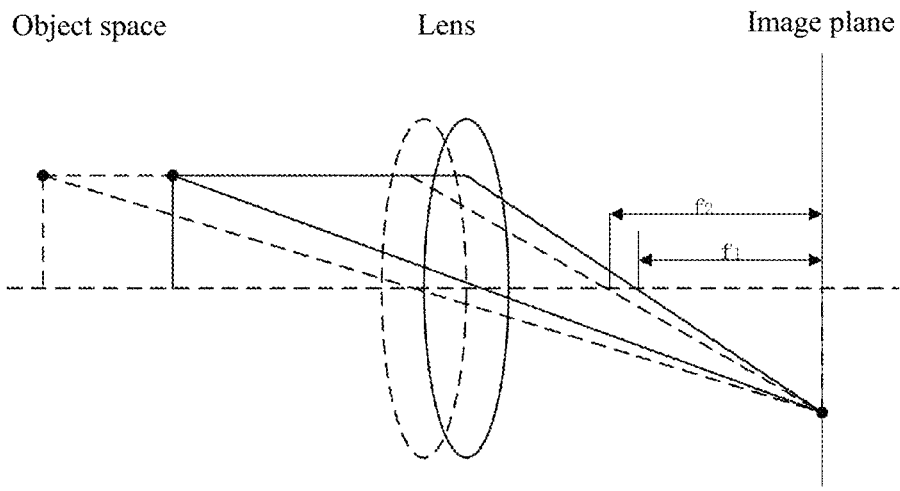
FIG. 8 is a schematic diagram of a relationship between different focusing distances and focal length values in one embodiment.

As shown in FIG. 8, that is a schematic diagram of a relationship between different focusing distances and focal length values in one embodiment. $f_1$, $f_2$ is the focal length value. A focusing lens can focus on objects of different depths within a certain range. During a focusing process, a motor will drive the lens to move, thereby changing the focal length of the lens to achieve focusing on objects of different depths. As shown in FIG. 8 below, when focusing on objects at different distances, the lens is driven by the motor and the focal length value changes.

In one embodiment, the acquiring corresponding depth information according to the focal length value includes:

acquiring a focusing curve, and acquiring depth information corresponding to the focal length value from the focusing curve, wherein the focusing curve is a correlation curve between the focal length value and the depth information.

The focusing curve is a correlation curve between the focal length value of the current lens and the depth information of the focusing region.

Specifically, the focusing curve is a curve established in advance according to the focal length value and depth information, and each focal length value corresponds to one piece of depth information. The ISP processor or the central processing unit of the electronic device can acquire the focusing curve. According to the correspondence between the focal length value of the recorded lens and the depth information of the focusing region in the focusing curve, the focal length value having a mapping relationship with the focal length value corresponding to the focusing region in the current posture can be obtained. The depth information of the mapping relationship is used as the depth information of the focusing region in the current posture. The depth information corresponding to the focal length value of the focusing region in the current posture can be quickly and simply obtained by the focusing curve, so that the depth information corresponding to the focusing region in the current posture can be indirectly obtained.

Figure 9:
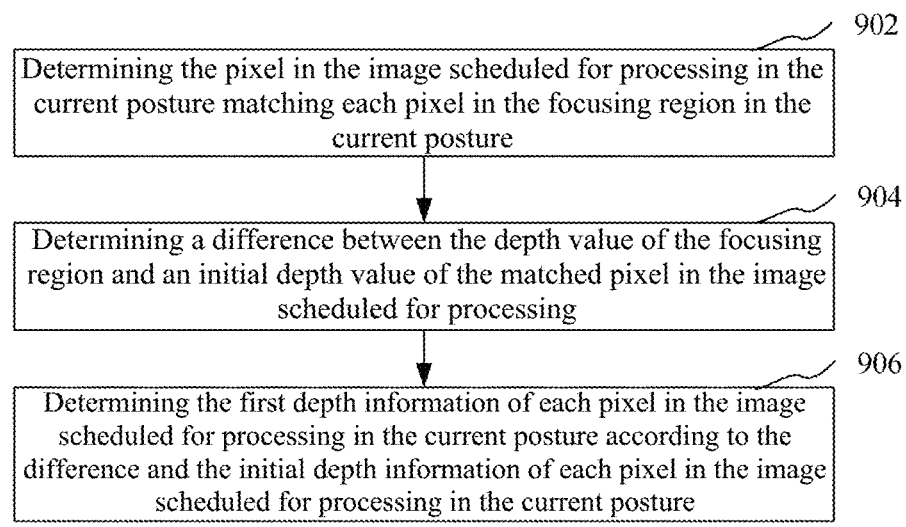
FIG. 9 is a flowchart of an operation of determining first depth information of each pixel in the image scheduled for processing in the current posture in another embodiment.

In one embodiment, as shown in FIG. 9, the depth information includes a depth value, and the performing fusion and correction processing on the initial depth information and the depth information of the focusing region in the current posture to obtain the first depth information of each pixel in the image scheduled for processing in the current posture includes:

Operation 902: determining the pixel in the image scheduled for processing in the current posture matching each pixel in the focusing region in the current posture.

Specifically, the ISP processor or the central processing unit of the electronic device can acquire the depth information of the focusing region in the current posture to obtain local depth information of a partial image in the focusing region in the image scheduled for processing. The ISP processor or the central processing unit of the electronic device can further determine a depth value of the focusing region. Next, matching each pixel in the partial image of the focusing region with each pixel in the image scheduled for processing in the current posture, and determining each pixel of the partial image of the focusing region and the pixel that has a corresponding relationship in the image scheduled for processing in the current posture point.

In this embodiment, the pixel among the pixels in the image scheduled for processing in the current posture that is the same as each pixel in the partial image of the focusing region may be determined, wherein the same pixels are matched successfully.

In this embodiment, there are a plurality of pixels in the focusing region, wherein the depth value of each pixel is the same. The plurality of pixels refer to at least two pixels.

Operation 904: determining a difference between the depth value of the focusing region and an initial depth value of the matched pixel in the image scheduled for processing.

Specifically, the ISP processor or the central processing unit of the electronic device acquires the initial depth value of the successfully matched pixels in the image scheduled for processing in the current posture, acquires the depth value of the focusing region, and calculates the difference between the two successfully matched pixels. Thus, the difference corresponding to each successfully matched pixel can be obtained.

Operation 906: determining the first depth information of each pixel in the image scheduled for processing in the current posture according to the difference and the initial depth information of each pixel in the image scheduled for processing in the current posture.

Specifically, the ISP processor or the central processing unit of the electronic device may determine an adjustment value according to a difference corresponding to each successfully matched pixel. The initial depth value of each pixel in the image scheduled for processing in the current posture is added to the adjustment value to obtain the first depth value of each pixel in the image scheduled for processing in the current posture, wherein the first depth value of each pixel is the first depth information corresponding to each pixel in the image scheduled for processing in the current posture.

In this embodiment, determining the adjustment value according to the difference corresponding to each successfully matched pixel includes: determining a median value or a maximum value or a minimum value of each difference corresponding to the matched pixel; using either the maximum value or the minimum value as the adjustment value.

Specifically, after each difference corresponding to the matched pixel is calculated, a median value of each difference may be calculated, and the median value may be a value obtained by performing weighted average processing on each difference. The initial depth value of each pixel in the image scheduled for processing in the current posture is added to the median value to obtain the first depth value of each pixel in the image scheduled for processing in the current posture.

It is also possible to arrange the differences in order from smallest to largest or from largest to smallest to select the maximum value of the differences, wherein the maximum value is added to the initial depth value of each pixel in the image scheduled for processing in the current posture to obtain the first depth value of each pixel. The minimum value of the differences may also be selected, wherein the initial depth value of each pixel in the image scheduled for processing in the current posture is added to the minimum value to obtain the first depth value of each pixel.

In the image processing method in this embodiment, the difference between the depth value of the focusing region and the initial depth value of the matched pixel in the image scheduled for processing can be determined, and the gap between the depth value of the pixel in the focusing region and the initial depth value of the matched pixel in the image scheduled for processing can be determined. According to the difference and the initial depth information of each pixel in the image scheduled for processing in the current posture, the depth information of a local image within the focusing region and the initial depth information in the image scheduled for processing can be fused to obtain accurate depth information of each pixel in the image scheduled for processing in the current posture, thereby improving the precision of the depth information of the image scheduled for processing.

In one embodiment, the depth information includes a depth value, and the performing fusion and correction processing on the initial depth information and the depth information of the focusing region in the current posture to obtain the first depth information of each pixel in the image scheduled for processing in the current posture includes:

determining the difference between the depth value of the focusing region and the initial depth value of each pixel in the image scheduled for processing in the current posture; determining the first depth information of each pixel in the image scheduled for processing in the current posture according to the difference and the initial depth information of each pixel in the image scheduled for processing in the current posture.

Specifically, the ISP processor or the central processing unit of the electronic device acquires the depth value of the focusing region in the current posture, and acquires the initial depth value of each pixel in the image scheduled for processing in the current posture. The different value corresponding to each pixel in the image scheduled for processing can be obtained by calculating the different value between the initial depth value of each pixel in the image scheduled for processing and the depth value of the focusing region. The ISP processor or the central processing unit of the electronic device can determine the adjustment value according to the difference corresponding to each pixel. The first depth value of each pixel in the image scheduled for processing in the current posture is obtained by adding the adjustment value to the initial depth value of each pixel in the image scheduled for processing in the current posture, wherein the first depth value of each pixel is the first depth information corresponding to each pixel in the image scheduled for processing in the current posture. Accurate depth information of each pixel in the image scheduled for processing in the current posture is obtained by fusing the depth information of the local image of the focusing region with the initial depth information of the image scheduled for processing.

In one embodiment, the depth information includes a depth value, and the performing fusion and correction processing on the initial depth information and the depth information of the focusing region in the current posture to obtain the first depth information of each pixel in the image scheduled for processing in the current posture includes:

Acquiring the depth value of each pixel in the focusing region in the current posture; determining the pixel in the image scheduled for processing in the current posture that matched with each pixel in the focusing region in the current posture; determining the difference between the depth value of each pixel within the focusing region and the initial depth value of the matched pixel in the image scheduled for processing; according to the difference and the initial depth information of each pixel in the image scheduled for processing in the current posture, determine the first depth information of each pixel in the image scheduled for processing in the current posture.

Specifically, there are a plurality of pixels in the focusing region, wherein the depth value of each pixel is different, that is, some pixels have the same depth value, some pixels have different depth values, or the depth values of each pixel are different. The ISP processor or the central processing unit of the electronic device can determine the depth value of each pixel in the partial image of the focusing region. Next, each pixel in the partial image of the focusing region is matched with each pixel in the image scheduled for processing in the current posture to determine the pixels with the correspondence in the partial image of the focusing region and the image scheduled for processing in the current posture. The ISP processor or the central processing unit of the electronic device calculates the difference between the matched pixels and can obtain the difference corresponding to the matched pixels. The ISP processor or the central processing unit of the electronic device can determine the adjustment value according to the difference corresponding to each successfully matched pixel. The initial depth value of each pixel in the image scheduled for processing in the current posture is added to the adjust to obtain the adjustment value to obtain the first depth value of each pixel in the image scheduled for processing in the current posture, wherein the first depth value of each pixel is the first depth information corresponding to each pixel in the image scheduled for processing in the current posture.

It can be understood that, after the differences are calculated in the above embodiments, the median value, the maximum value, or the minimum value of each difference can be determined; any one of the median value, the maximum value, or the minimum value can be used as the adjustment value. The median value may be a value obtained by performing a weighted average process on each difference.

Figure 10:
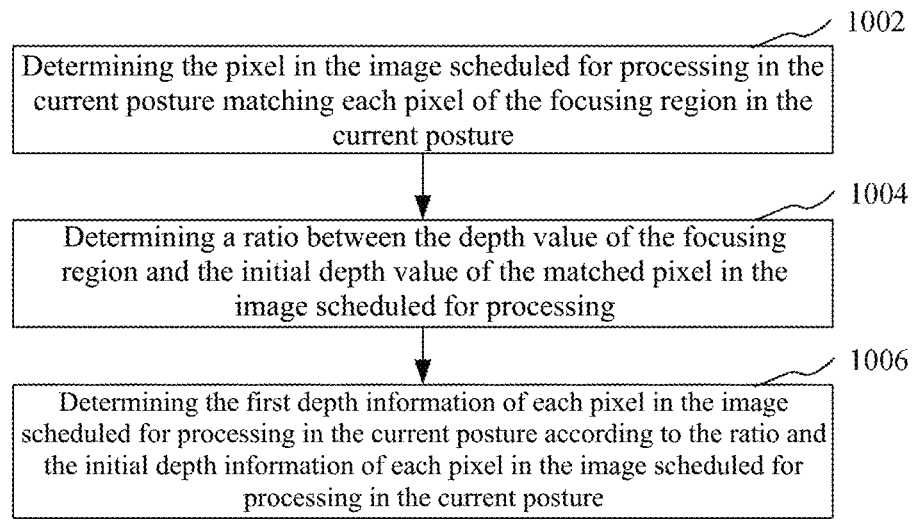
FIG. 10 is a flowchart of an operation of determining the first depth information of each pixel in the image scheduled for processing in the current posture in one of the embodiments.

In one embodiment, as shown in FIG. 10, the depth information includes a depth value, and the performing fusion and correction processing on the initial depth information and the depth information of the focusing region in the current posture to obtain the first depth information of each pixel in the image scheduled for processing in the current posture includes:

Operation 1002: determining the pixel in the image scheduled for processing in the current posture matching each pixel of the focusing region in the current posture.

Specifically, the ISP processor or the central processing unit of the electronic device can acquire the depth information of the focusing region in the current posture to obtain the local depth information of the partial image in the focusing region in the image scheduled for processing, that is, the depth value of the focusing region. Next, each pixel in the partial image of the focusing region is matched with each pixel in the image scheduled for processing in the current posture to determine the pixels with the correspondence in the partial image of the focusing region and the image scheduled for processing in the current posture.

In this embodiment, the pixel among the pixels in the image scheduled for processing in the current posture that is the same as each pixel in the partial image of the focusing region may be determined, wherein the same pixels are matched successfully. There are a plurality of pixels in the focusing region, wherein the depth value of each pixel is the same. The plurality of pixels refer to at least two pixels.

Operation 1004: determining a ratio between the depth value of the focusing region and the initial depth value of the matched pixel in the image scheduled for processing.

Specifically, the ISP processor or the central processing unit of the electronic device acquires the initial depth value of the successfully matched pixel in the image scheduled for processing in the current posture, and acquires the depth value of the successfully matched pixel in the partial image of the focusing region, and calculates the ratio between the two successfully matched pixels, so that the ratio corresponding to each successfully matched pixel can be obtained.

Operation 1006: determining the first depth information of each pixel in the image scheduled for processing in the current posture according to the ratio and the initial depth information of each pixel in the image scheduled for processing in the current posture.

Specifically, the ISP processor or the central processing unit of the electronic device can determine an adjustment ratio according to the ratio corresponding to each successfully matched pixel. The first depth value of each pixel in the image scheduled for processing in the current posture can be obtained by multiplying the initial depth value of each pixel in the image scheduled for processing in the current posture by the adjustment ratio, wherein the first depth value of each pixel is the first depth information corresponding to each pixel in the image scheduled for processing in the current posture.

In this embodiment, the determining the adjustment ratio according to the ratio corresponding to each successfully matched pixel includes:

determining the median value or the maximum value or the minimum value of each ratio corresponding to the matched pixel; using any one of the median value, the maximum value, or the minimum value as the adjustment ratio.

Specifically, after each ratio corresponding to the matched pixels is calculated, the median value of each ratio can be calculated, wherein the median value can be a value obtained by performing weighted average processing on each ratio. The initial depth value of each pixel in the image scheduled for processing in the current posture is multiplied by the median value to obtain the first depth value of each pixel in the image scheduled for processing in the current posture.

It is also possible to arrange the ratios in order from smallest to largest or from largest to smallest to select the maximum value of the ratios is selected, wherein the initial depth value of each pixel in the image scheduled for processing in the current posture is multiplied by the maximum value to obtain the first depth value of each pixel. The minimum value of the ratios may also be selected, wherein the initial depth value of each pixel in the image scheduled for processing in the current posture is multiplied by the minimum value to obtain the first depth value of each pixel.

In the image processing method in this embodiment, the ratio between the depth value of the focusing region and the initial depth value of the matched pixel in the image scheduled for processing can be determined, and a difference proportion between the depth value of the pixel of the focusing region and the initial depth values of matching pixels in the image scheduled for processing can be determined. According to the ratio and the initial depth information of each pixel in the image scheduled for processing in the current posture, the depth information of the local image of the focusing region and the initial depth information in the image scheduled for processing can be fused to obtain accurate depth information of each pixel in the image scheduled for processing in the current posture, so that the obtained depth information of the image scheduled for processing has higher precision.

In one embodiment, the depth information includes a depth value, and the processing the initial depth information and the depth information of the focusing region in the current posture in a fusing and correcting manner to obtain the first depth information of each pixel in the image scheduled for processing in the current posture includes:

determine a ratio between the depth value of the focusing region and the initial depth value of each pixel in the image scheduled for processing in the current posture; determine the first depth information of each pixel in the image scheduled for processing in the current posture according to the ratio and the initial depth information of each pixel in the image scheduled for processing in the current posture.

Specifically, the ISP processor or central processing unit of the electronic device calculates the ratio between the initial depth value of each pixel in the image scheduled for processing and the depth value of the focusing region, and the ratio corresponding to each pixel in the image scheduled for processing can be obtained. The ISP processor or the central processing unit of the electronic device can determine the adjustment value according to the ratio corresponding to each pixel. The initial depth value of each pixel in the image scheduled for processing in the current posture is multiplied by the adjustment value to obtain the first depth value of each pixel in the image scheduled for processing in the current posture, wherein the first depth value of each pixel is the first depth information corresponding to each pixel in the image scheduled for processing in the current posture.

In one embodiment, the depth information includes a depth value, and the performing fusion and correction processing on the initial depth information and the depth information of the focusing region in the current posture to obtain the first depth information of each pixel in the image scheduled for processing in the current posture includes:

acquiring the depth value of each pixel in the focusing region in the current posture; determining the pixel in the image scheduled for processing in the current posture matching each pixel of the focusing region in the current posture; determining a ratio between the depth value of each pixel of the focusing region and the initial depth value of the matched pixel in the image scheduled for processing; determining the first depth information of each pixel in the image scheduled for processing in the current posture according to the ratio and the initial depth information of each pixel in the image scheduled for processing in the current posture.

Specifically, there are a plurality of pixels in the focusing region, wherein the depth value of each pixel is different, that is, the depth values of some pixels in the focusing region are the same, the depth values of some pixels are different, or the depth value of each pixel is different. The ISP processor or the central processing unit of the electronic device can determine the depth value of each pixel in the partial image of the focusing region. Next, each pixel in the partial image of the focusing region is matched with each pixel in the image scheduled for processing in the current posture to determine the pixels with the correspondence in the partial image of the focusing region and the image scheduled for processing in the current posture. The ISP processor or the central processing unit of the electronic device calculates the ratio between the matched pixels and can obtain the ratio corresponding to each matched pixel. The ISP processor or the central processing unit of the electronic device can determine the adjustment value according to the ratio corresponding to each successfully matched pixel. The initial depth value of each pixel in the image scheduled for processing in the current posture is multiplied by the adjustment value to obtain the first depth value of each pixel in the image scheduled for processing in the current posture, wherein the first depth value of each pixel is the first depth information corresponding to each pixel in the image scheduled for processing in the current posture.

It can be understood that, after the ratios are calculated in the above embodiments, the median value or the maximum value or the minimum value of each ratio can be determined; any one of the median value, the maximum value, or the minimum value can be used as the adjustment value. The median value may be a value obtained by performing weighted average processing on each ratio.

In one embodiment, the determining second depth information of each pixel in the image scheduled for processing in a target posture according to the target posture information and the first depth information of each pixel in the image scheduled for processing in the current posture includes:

acquiring first three-dimensional coordinate corresponding to each pixel in the image scheduled for processing in the current posture; converting the first three-dimensional coordinate into second three-dimensional coordinate according to the target posture information using a coordinate transformation algorithm to obtain the second depth information of each pixel in the image scheduled for processing in the target posture, wherein the second three-dimensional coordinate is a three-dimensional coordinate corresponding to each pixel in the image scheduled for processing in the target posture.

Specifically, the ISP processor or the central processing unit of the electronic device acquires the three-dimensional coordinate in the world coordinate system for each pixel in the image scheduled for processing in the current posture, that is, the first three-dimensional coordinate, and converts the first three-dimensional coordinate corresponding to each pixel in the current posture into the second three-dimensional coordinate in the target posture by the coordinate transformation algorithm. Further, the second three-dimensional coordinate is the three-dimensional coordinate in the world coordinate system for each pixel in the image scheduled for processing in the target posture. The three-dimensional coordinate of each pixel in the image scheduled for processing can be converted from the current posture to the target posture by the coordinate transformation algorithm, thereby determining the re-projection mode of each pixel.

For example, the coordinate transformation algorithm is:

$$\begin{bmatrix} x' \\ y' \\ z' \end{bmatrix} = \begin{bmatrix} R' & T' \\ 1 & 0 \end{bmatrix}^{-1} \begin{bmatrix} R & T \\ 1 & 0 \end{bmatrix} \begin{bmatrix} x \\ y \\ z \end{bmatrix} \quad (3)$$

wherein, (x, y, z) is the first three-dimensional coordinate corresponding to each pixel in the current posture, (x', y', z') is the second three-dimensional coordinate corresponding to each pixel in the target posture, R and T are the rotation matrix and translation matrix in the world coordinate system for the camera in the current posture, which represent the current posture information of the camera. R' and T' are the rotation matrix and translation matrix in the world coordinate system for the camera in the target posture, which represent the target posture information of the camera. The ISP processor or the central processing unit of the electronic device acquires (x, y, z) of each pixel in the image scheduled for processing in the current posture, and can obtain R, T, R', and T' according to the current posture information and the target posture information, wherein these data can be substituted into the above-mentioned coordinate transformation algorithm to calculate (x', y', z') corresponding to each pixel.

The image processing method in this embodiment uses the coordinate transformation algorithm to convert the coordinate of each pixel in the image scheduled for processing in the current posture into the corresponding coordinate in the target posture, so that each pixel can be purposefully re-projected to achieve purposeful anti-shake for each pixel.

Figure 11:
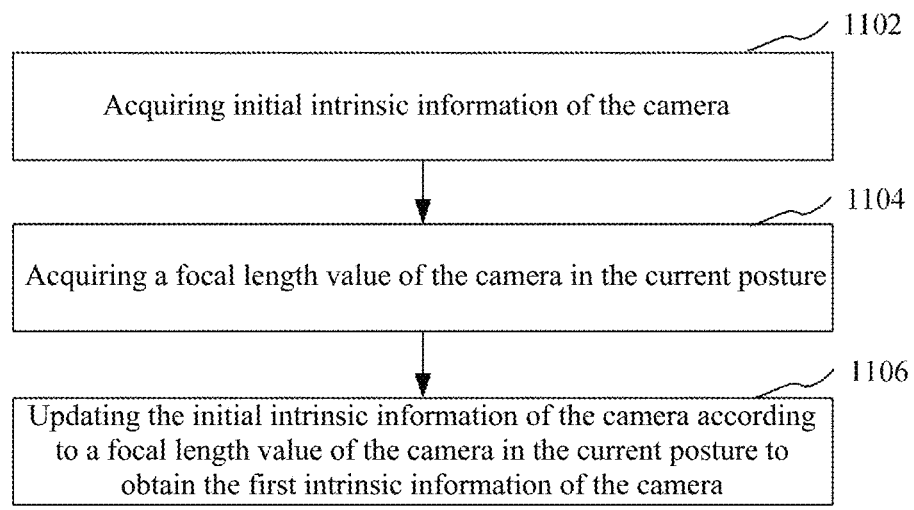
FIG. 11 is a flowchart of an operation of acquiring first intrinsic information of the camera in one embodiment.

In one embodiment, as shown in FIG. 11, the acquiring of the first intrinsic information of the camera includes:

Operation 1102: acquiring initial intrinsic information of the camera.

Operation 1104: acquiring a focal length value of the camera in the current posture.

The initial intrinsic information is preset intrinsic information of the camera at a specific focusing distance.

Specifically, the camera needs to be calibrated before leaving the factory, and the initial intrinsic information is the intrinsic information at a specific focusing distance predetermined before the camera leaves the factory. The ISP processor or the central processing unit of the electronic device acquires the initial intrinsic information of the camera, wherein the initial intrinsic information includes a focal length value and a central coordinate offset of the camera. When focusing is performed, the focal length value of the lens will change at different focusing positions, and the ISP processor or central processing unit of the electronic device can acquire a real-time focal length value of the camera lens according to a focusing region in the current posture.

Operation 1106: updating the initial intrinsic information of the camera according to a focal length value of the camera in the current posture to obtain the first intrinsic information of the camera.

Specifically, the ISP processor or the central processing unit of the electronic device can replace the focal length value in the initial intrinsic information of the camera with the focal length value of the lens in the current posture, so that the intrinsic information is updated, wherein the updated intrinsic information is the first intrinsic information of the camera.

The image processing method in this embodiment acquires the real-time focal length value of the camera in the current posture to update the intrinsic information of the camera, that can solve the problem that real depth information of each pixel of the image cannot be detected, that is caused by using the same focal length value in traditional image processing methods to project each pixel in the image scheduled for processing onto the same unit plane. The image processing method in this embodiment improves the accuracy of depth information detection.

In one embodiment, an image processing method is provided and includes:

- Operation (a1): acquiring current angular velocity information of the camera, and converting the current angular velocity information into a first rotation matrix.
- Operation (a2): acquiring current acceleration information of the camera, and converting the current acceleration information into a first translation matrix, wherein the first rotation matrix and the first translation matrix are used to represent the current posture information of the camera.
- Operation (a3): converting the first rotation matrix and the first translation matrix into the target posture information.
- Operation (a4): performing low-pass filtering on each of the first rotation matrix and the first translation matrix in the frequency domain space.
- Operation (a5): converting the first rotation matrix and the first translation matrix, that are processed by low-pass filtering, into time domain space to obtain a second rotation matrix and a second translation matrix, wherein the second rotation matrix and the second translation matrix are used to represent the target posture information of the camera.
- Operation (a6): acquiring initial depth information of each pixel in the image scheduled for processing in the current posture.
- Operation (a7): determining the focusing region in the current posture, acquiring a relational mapping table, and acquiring the focal length value corresponding to the focusing region from the relational mapping table, wherein the mapping relationship between the focusing region and the focal length value is recorded in the relational mapping table.
- Operation (a8): acquiring a focusing curve, and acquiring depth information corresponding to the focal length value from the focusing curve, wherein the focusing curve is a correlation curve between the focal length value and the depth information, and using the depth information corresponding to the focal length value as the depth information of the focusing region in the current posture.
- Operation (a9): acquiring a depth value of the focusing region in the current posture.
- Operation (a10): determining the pixel in the image scheduled for processing in the current posture matching each pixel in the focusing region in the current posture.
- Operation (a11): determining a difference or ratio between the depth value of the focusing region and an initial depth value of the matched pixel in the image scheduled for processing.
- Operation (a12): determining first depth information of each pixel in the image scheduled for processing in the current posture according to the difference or ratio and the initial depth information of each pixel in the image scheduled for processing in the current posture.
- Operation (a13): acquiring first three-dimensional coordinate corresponding to each pixel in the image scheduled for processing in the current posture.
- Operation (a14): converting the first three-dimensional coordinate into second three-dimensional coordinate according to the target posture information using a coordinate transformation algorithm to obtain the second depth information of each pixel in the image scheduled for processing in the target posture, wherein the second three-dimensional coordinate is a three-dimensional coordinate corresponding to each pixel in the image scheduled for processing in the target posture.
- Operation (a15): acquiring initial intrinsic information of the camera, and acquiring a focal length value of the camera in the current posture.
- Operation (a16): updating the initial intrinsic information of the camera according to the focal length value of the camera in the current posture to obtain first intrinsic information of the camera.
- Operation (a17): performing a re-projection process on the image scheduled for processing according to the current posture information, the first depth information, the target posture information, the second depth information, and the first intrinsic information to obtain a target image.

In the image processing method in this embodiment, the current posture information of the camera in the time domain space can be obtained by acquiring the current angular velocity information and acceleration information of the camera. The current posture information in the time domain space is converted into the frequency domain, so that characteristics of the current posture information are more intuitive, and the target posture corresponding to the current posture can be more accurately predicted. The initial depth information of each pixel in the image scheduled for processing and the depth information of the focusing region in the current posture are acquired, and the two kinds of depth information are fused and superimposed to obtain the depth information of each pixel in the image scheduled for processing in the current posture that is more accurate. The three-dimensional coordinate of the image scheduled for processing in a stable state can be determined by converting the coordinate of each pixel in the current posture into the corresponding coordinate in the target posture. Initial memory information is updated according to the focal length value of the camera lens obtained in the current posture, so that an object distance in a photographed picture is closer to an object distance of an actual scene. According to the current posture information, the first depth information, the target posture information, the second depth information, and the first intrinsic information, the image scheduled for processing is re-projected, and the pixel coordinate of each pixel in the target posture can be obtained, so that the target image with consistent anti-shake effect can be output.

Figure 12:
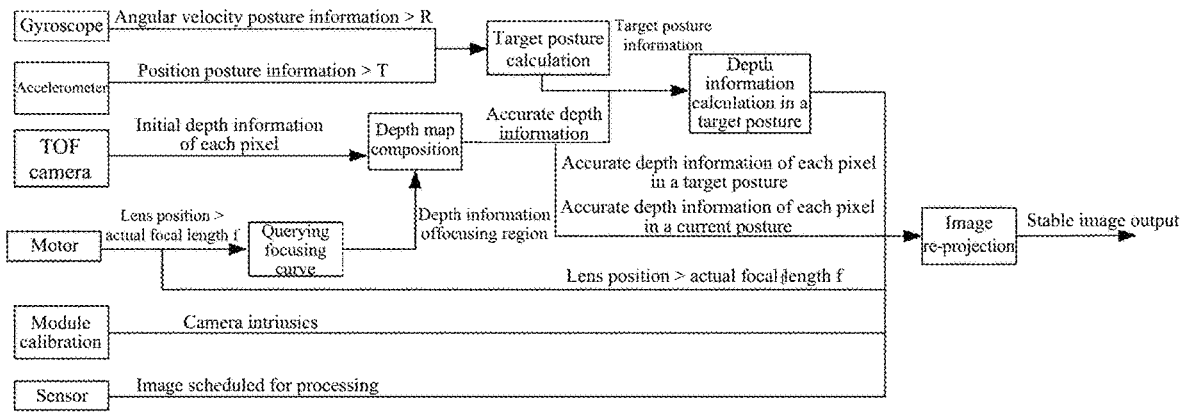
FIG. 12 is a schematic diagram of an image processing method in one embodiment.

As shown in FIG. 12, that is a schematic diagram of an image processing method in one embodiment.

The IPS processor or the central processing unit of the electronic device acquires the angle posture information by the gyroscope and acquires the position posture information by the accelerometer to obtain the current posture information of the camera. The current posture information of the camera is converted to the target posture information when the image is stabilized. Next, the IPS processor or the central processing unit of the electronic device acquires the initial depth information of each pixel in the image scheduled for processing by the TOF camera, drives the lens to focus by the motor, and acquires the real focal length value in the current posture according to the focusing position. Then, the depth information corresponding to the real focal length value in the current posture is determined by the current focusing curve. The depth information corresponding to the real focal length value in the current posture is synthesized with the initial depth information of each pixel in the image scheduled for processing acquired by the TOF camera to obtain the accurate depth information of each pixel in the image scheduled for processing in the current posture. The accurate depth information of each pixel in the image scheduled for processing in the current posture is converted into depth information corresponding to each pixel in the target posture. Next, the IPS processor or the central processing unit of the electronic device acquires the initial intrinsic information of the camera in a calibration manner by the camera module and updates the initial intrinsic information according to the real focal length value in the current posture. The image scheduled for processing in the current posture is acquired by the image sensor. According to the updated intrinsic information, the current posture information, the accurate depth information of each pixel in the image scheduled for processing in the current posture, the target posture information, and the depth information corresponding to each pixel in the target posture, the image scheduled for processing is re-projected to output a stable target image.

Figure 13:
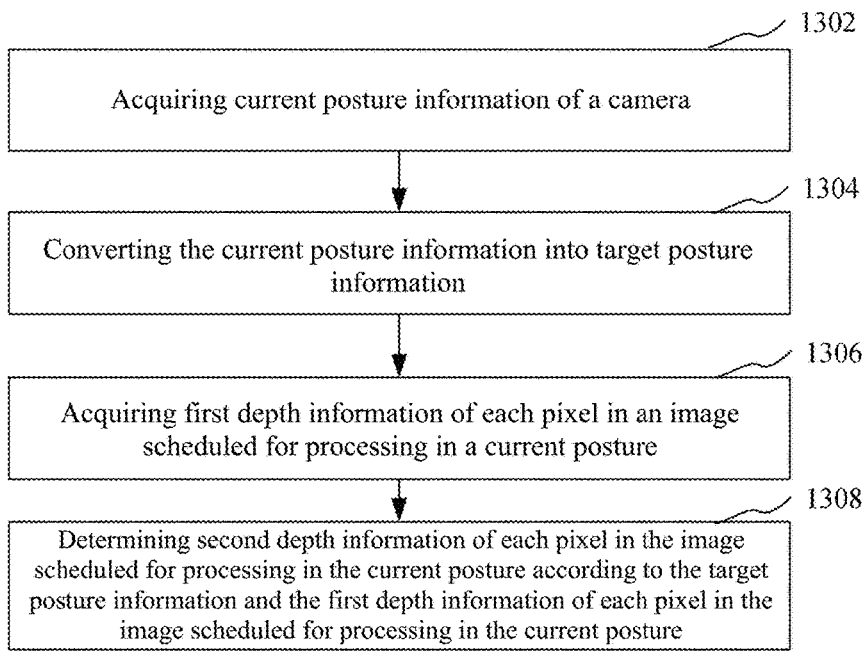
FIG. 13 is a flowchart of a method for acquiring depth information in one embodiment.

In one embodiment, as shown in FIG. 13, a depth information acquisition method is provided and includes:

Operation 1302: acquiring current posture information of a camera.

Specifically, the ISP processor or the central processing unit of the electronic device may acquire angle posture information and position posture information of the camera. The ISP processor or the central processing unit of the electronic device can detect angular velocity of the camera in the current posture, and obtain angular posture information by using a relationship between the angular velocity and time. The position posture information can be obtained by detecting the acceleration of the camera in the current posture and using the relationship between the acceleration and time.

Operation 1304: converting the current posture information into target posture information.

Specifically, after the ISP processor or the central processing unit of the electronic device obtains the current posture information of the camera, a prediction can be predicted according to the current posture to determine the target posture corresponding to the current posture. Further, the current posture information can be converted into target posture information by a target posture prediction algorithm.

Operation 1306: acquiring first depth information of each pixel in an image scheduled for processing in a current posture.

Specifically, the ISP processor or the central processing unit of the electronic device may acquire the first depth information corresponding to each pixel in the image scheduled for processing in the current posture.

Operation 1308: determining second depth information of each pixel in the image scheduled for processing in the current posture according to the target posture information and the first depth information of each pixel in the image scheduled for processing in the current posture.

Specifically, after the ISP processor or the central processing unit of the electronic device converts the current posture information into the target posture information, the target posture corresponding to the current posture is obtained. According to the current posture and the target posture, the first depth information of each pixel in the image scheduled for processing in the current posture can be converted into the second depth information of each pixel in the image scheduled for processing in the target posture by using coordinate transformation.

The depth information acquisition method in this embodiment acquires the current posture information of the camera, converts the current posture information into the target posture information, acquires the first depth information of each pixel in the image scheduled for processing in the current posture, and determines the second depth information of each pixel in the image scheduled for processing in the target posture according to the target posture information and the first depth information of each pixel in the image scheduled for processing in the current posture. Thus, accurate depth information of the image scheduled for processing in the target posture can be obtained.

Figure 14:
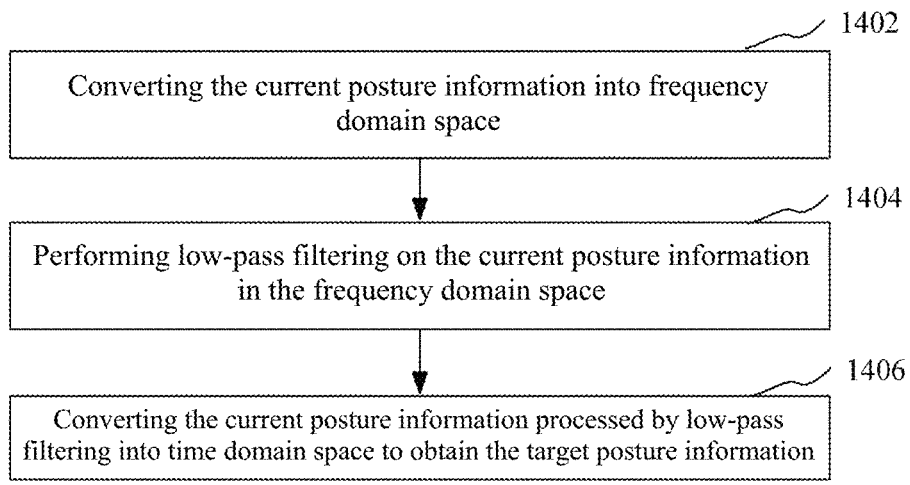
FIG. 14 is a flowchart of an operation of converting current posture information into target posture information in one embodiment.

In one embodiment, as shown in FIG. 14, the converting the current posture information into the target posture information includes:

Operation 1402: converting the current posture information into frequency domain space.

Specifically, the ISP processor or the central processing unit acquires angular velocity information by a gyroscope and acquires acceleration information by an accelerometer. The angular velocity and acceleration are converted into the current posture information by performing an integral on the angular velocity information and acceleration information in the time domain. Then, the ISP processor or the central processing unit can convert the current posture information in the time domain space to the frequency domain space.

Operation 1404: performing low-pass filtering on the current posture information in the frequency domain space.

Specifically, the ISP processor or the central processing unit performs low-pass filtering on the current posture information to remove high-frequency components in the current posture information and retain low-frequency components in the current posture information.

Operation 1406: converting the current posture information processed by low-pass filtering into time domain space to obtain the target posture information.

Specifically, the ISP processor or the central processing unit then converts the current posture information processed by low-pass filtering into the time domain space, wherein the posture information obtained after the information processed by low-pass filtering is converted from the frequency domain space to the time domain space is the target posture information.

The depth information acquisition method in this embodiment converts the current posture information into the frequency domain space, make energy of the image scheduled for processing be mainly concentrated in the low frequency, and performs the low-pass filtering on the current posture information in the frequency domain space, that can remove the high-frequency components and retain the low-frequency components, thereby retaining key information in the image scheduled for processing and making information of the image scheduled for processing more intuitive. The current posture information processed by low-pass filtering is converted to the time domain space to obtain the target posture information. The current posture information can be accurately converted into the target posture information, so that the posture information of the image scheduled for processing in a stable state, i.e., the target posture information, can be predicted.

Figure 15:
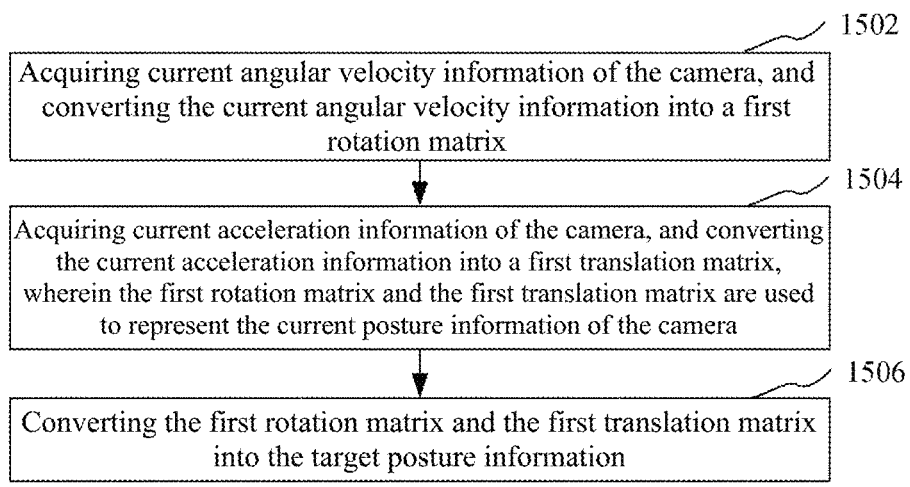
FIG. 15 is a flow chart of an operation of acquiring current posture information of a camera in another embodiment.

In one embodiment, as shown in FIG. 15, the acquiring the current posture information of the camera includes:

Operation 1502: acquiring current angular velocity information of the camera, and converting the current angular velocity information into a first rotation matrix.

Specifically, the ISP processor or the central processing unit of the electronic device outputs the tri-axial angular velocity by the gyroscope and performs the components of each axis in the time dimension in an integral manner to obtain tri-axial angular velocity information. Next, a rotation angle of each axis may be converted into a first rotation matrix by using a left-handed coordinate system or a right-handed coordinate system.

Operation 1504: acquiring current acceleration information of the camera, and converting the current acceleration information into a first translation matrix, wherein the first rotation matrix and the first translation matrix are used to represent the current posture information of the camera.

Specifically, the ISP processor or the central processing unit of the electronic device outputs the tri-axial acceleration by the accelerometer, and performs the components of each axis in the time dimension in an integral manner to obtain tri-axial acceleration information. Next, the rotation angle of each axis may be converted into a first rotation matrix by using a left-handed coordinate system or a right-handed coordinate system. It can be understood that the first rotation matrix and the first translation matrix are respectively obtained by converting the angular velocity information and the acceleration information in one of the left-handed coordinate system or the right-handed coordinate system. The first rotation matrix and the first translation matrix are used to represent the current posture information of the camera.

The converting the current posture information into the target posture information includes:

Operation 1506: converting the first rotation matrix and the first translation matrix into the target posture information.

Specifically, the ISP processor or the central processing unit of the electronic device can convert the first rotation matrix in the current posture into the rotation matrix in the target posture, and convert the first translation matrix in the current posture into the translation matrix in the target posture, wherein the rotation matrix and the translation matrix in the target posture can be used to represent the target posture information.

The depth information acquisition method in this embodiment acquires the current angular velocity information of the camera, converts the current angular velocity information into the first rotation matrix, acquires the current acceleration information of the camera, and converts the current acceleration information into the first translation matrix, wherein the first rotation matrix and the first translation matrix are used to represent the current posture information of the camera, and converts the first rotation matrix and the first translation matrix into the target posture information, so that the target posture information of the camera can be predicted according to the current posture information of the camera.

Figure 16:
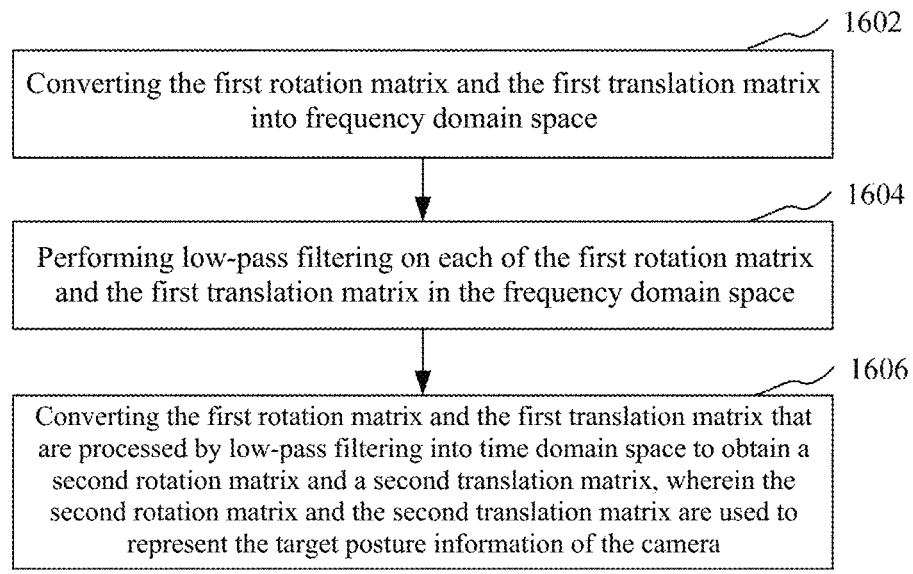
FIG. 16 is a flowchart of an operation of converting a first rotation matrix and a first translation matrix into target posture information in another embodiment.

In one embodiment, as shown in FIG. 16, the converting the first rotation matrix and the first translation matrix into the target posture information includes:

Operation 1602: converting the first rotation matrix and the first translation matrix into frequency domain space.

Specifically, the ISP processor or central processing unit of the electronic device performs an integral on the current tri-axial angular velocity and tri-axial acceleration of the camera in time domain to obtain corresponding tri-axial angular velocity information and tri-axial acceleration information, and converts the tri-axial angular velocity information and the three-axis acceleration information into the first rotation matrix and the first translation matrix in the time domain space. Next, the ISP processor or the central processing unit of the electronic device converts the first rotation matrix and the first translation matrix in the time domain space into the frequency domain space to obtain the first rotation matrix and the first translation matrix in the frequency domain space.

Operation 1604: performing low-pass filtering on each of the first rotation matrix and the first translation matrix in the frequency domain space.

Specifically, the ISP processor or the central processing unit of the electronic device processes the first rotation matrix in the frequency domain space by low-pass filtering to remove the high-frequency components and retain the low-frequency components, so as to obtain the first rotation matrix of the low-frequency components in the frequency domain space. Similarly, the first translation matrix in the frequency domain space is processed by low-pass filtering to remove the high-frequency components and retain the low-frequency components to obtain the first translation matrix of low-frequency components in the frequency domain space.

Operation 1606: converting the first rotation matrix and the first translation matrix, that are processed by low-pass filtering, into time domain space to obtain a second rotation matrix and a second translation matrix, wherein the second rotation matrix and the second translation matrix are used to represent the target posture information of the camera.

Specifically, the ISP processor or the central processing unit of the electronic device converts the first rotation matrix and the first translation matrix of the low-frequency components in the frequency domain space into the time domain space to obtain the second rotation matrix and the first translation matrix in the time domain space, wherein the second rotation matrix and the second translation matrix are used to represent the target posture information of the camera.

In this embodiment, the ISP processor or the central processing unit of the electronic device can convert the first rotation matrix and the first translation matrix in the time domain space into the frequency domain space by using Fourier transform algorithm, discrete transform algorithm, and other algorithms, and then convert the first rotation matrix and the first translation matrix of the low-frequency components in the frequency domain space into the time domain space by using the Fourier transform algorithm, discrete transform algorithm, and other algorithms to obtain the target posture information.

The image processing method in this embodiment converts the first rotation matrix and the first translation matrix in the time domain space into the frequency domain space, so that more detailed information of the image scheduled for processing can be obtained, and the first rotation matrix and the first translation matrix in the frequency domain are processed by low-pass filtering, which can retain key information of the image, remove unnecessary information, and make the image information more intuitive. The first rotation matrix and the first translation matrix, that are processed by the low-pass filter, are converted into the time domain space to obtain the second rotation matrix and the second translation matrix, wherein the second rotation matrix and the second translation matrix are used to represent the target posture information of the camera, to obtain the posture information of the camera when the image scheduled for processing is stable, that is, the target posture information.

In one embodiment, a method depth information acquisition is provided and includes:

Operation (b1): acquiring current angular velocity information of the camera, and converting the current angular velocity information into a first rotation matrix.

Operation (b2): acquiring current acceleration information of the camera, and converting the current acceleration information into a first translation matrix, wherein the first rotation matrix and the first translation matrix are used to represent the current posture information of the camera.

Operation (b3): converting the first rotation matrix and the first translation matrix into the target posture information.

Operation (b4): performing low-pass filtering on each of the first rotation matrix and the first translation matrix in the frequency domain space.

Operation (b5): converting the first rotation matrix and the first translation matrix, that are processed by low-pass filtering, into time domain space to obtain a second rotation matrix and a second translation matrix, wherein the second rotation matrix and the second translation matrix are used to represent the target posture information of the camera.

Operation (b6): acquiring depth information of each pixel in the image scheduled for processing in the current posture.

Operation (b7): determining the second depth information of each pixel in the image scheduled for processing in the target posture according to the target posture information and the first depth information of each pixel in the image scheduled for processing in the current posture.

In the above method for acquiring depth information, the current posture information of the camera in the time domain space can be obtained by acquiring the current angular velocity information and acceleration information of the camera. The current posture information in the time domain space is converted into the frequency domain, so that characteristics of the current posture information are more intuitive, and the target posture corresponding to the current posture can be more accurately predicted. In addition, the depth information of each pixel in the image scheduled for processing in the current posture is converted into the second depth information of each pixel in the target posture, so that the obtained depth information of each pixel in the image scheduled for processing in the target posture is more accurate.

It should be understood that, although each of operations in the flowcharts of FIGS. 2 to 16 are displayed in sequence according to arrows, these operations are not necessarily executed sequentially in the order indicated by the arrows. Unless otherwise specified herein, the execution of these operations is not strictly limited in order, and these operations may be performed in other orders. Moreover, at least one part of the operations in FIGS. 2 to 16 may include multiple sub-operations or multiple stages. These sub-operations or stages are not necessarily executed and completed at the same time, but may be executed at different times. The execution order of the sub-operations or the stages is also not necessarily sequential, but may be performed in turn or alternately with other operations or sub-operations of other operations or at least one part of stages.

Figure 17:
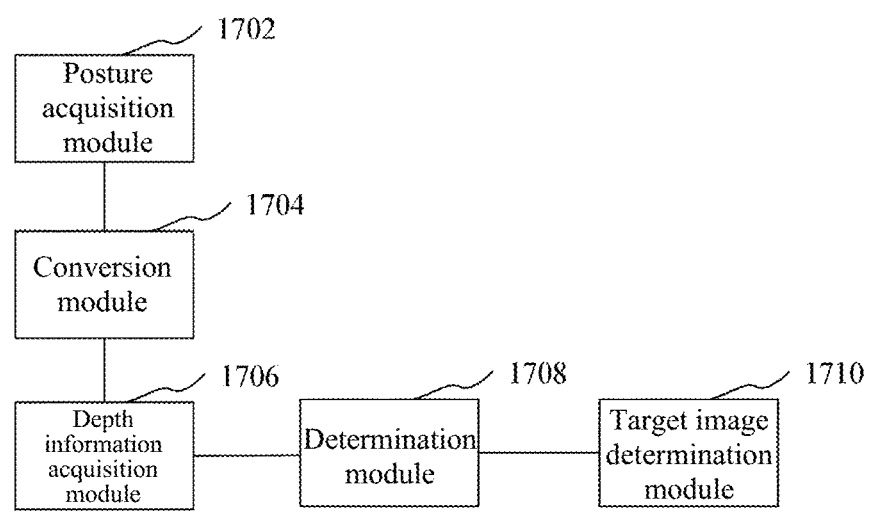
FIG. 17 is a structural block diagram of an image processing apparatus in one embodiment.

FIG. 17 is a structural block diagram of an image processing apparatus according to an embodiment. As shown in FIG. 17, the image processing apparatus includes a posture acquisition module 1702, a conversion module 1704, a depth information acquisition module 1706, a determination module 1708, and a target image determination module 1710. In which, The posture acquisition module 1702 is used to acquire current posture information of a camera.

The conversion module 1704 is used to convert the current posture information into target posture information.

The depth information acquisition module 1706 is used to acquire first depth information of each pixel in an image scheduled for processing in a current posture.

The determination module 1708 is used to determine second depth information of each pixel in the image scheduled for processing in a target posture according to the target posture information and the first depth information of each pixel in the image scheduled for processing in the current posture.

The target image determination module 1710 is used to acquire first intrinsic information of the camera and perform a re-projection process on the image scheduled for processing according to the current posture information, the first depth information, the target posture information, the second depth information, and the first intrinsic information to obtain a target image.

The image processing method and apparatus, electronic device, and computer-readable storage medium in the present embodiment are used for acquiring current posture information of a camera, converting the current posture information into target posture information, acquiring first depth information of each pixel in an image scheduled for processing in a current posture, determining second depth information of each pixel in the image scheduled for processing in a target posture according to the target posture information and the first depth information of each pixel in the image scheduled for processing in the current posture, acquiring first intrinsic information of the camera and performing re-projection processing on the image scheduled for processing according to the current posture information, the first depth information, the target posture information, the second depth information, and the first intrinsic information to obtain a target image. Thus, purposeful anti-shaking for each pixel can be achieved, making the anti-shake effect of photographing more stable.

In one embodiment, the conversion module 1704 is further used to convert the current posture information into frequency domain space; perform low-pass filtering processing on the current posture information in the frequency domain space; convert the current posture information processed by low-pass filtering into time domain space to obtain the target posture information. It can convert the current posture information into the frequency domain space, make energy of the image scheduled for processing be mainly concentrated in the low frequency, and performs the low-pass filtering on the current posture information in the frequency domain space, that can remove the high-frequency components and retain the low-frequency components, thereby retaining key information in the image scheduled for processing and making information of the image scheduled for processing more intuitive. The current posture information processed by low-pass filtering is converted to the time domain space, the current posture information into the target posture information can be accurately converted, so that the posture of the image scheduled for processing in a stable state can be predicted.

In one embodiment, the posture acquisition module 1702 is further used to acquire current angular velocity information of the camera, and convert the current angular velocity information into a first rotation matrix; acquire current acceleration information of the camera, and convert the current acceleration information into a first translation matrix, wherein the first rotation matrix and the first translation matrix are used to represent the current posture information of the camera. The conversion module 1704 is further used to convert the first rotation matrix and the first translation matrix into target posture information. The current angular velocity information is converted into a first rotation matrix, the current acceleration information is converted into a first translation matrix, and the first rotation matrix and the first translation matrix are converted into target posture information, so that the target posture information of the camera can be predicted according to the current posture information of the camera.

In one embodiment, the conversion module 1704 is further used to convert the first rotation matrix and the first translation matrix into frequency domain space; perform low-pass filtering on each of the first rotation matrix and the first translation matrix in the frequency domain space; convert the first rotation matrix and the first translation matrix processed by low-pass filtering process into the time domain space to obtain the second rotation matrix and the second translation matrix, wherein the second rotation matrix and the second translation matrix are used to represent the target posture information of the camera.

The image processing apparatus in this embodiment converts the first rotation matrix and the first translation matrix in the time domain space into the frequency domain space, so that more detailed information of the image scheduled for processing can be obtained, making the image information more intuitive. The first rotation matrix and the first translation matrix processed by the low-pass filtering are converted into the time domain space, so as to obtain the posture information of the camera when the image scheduled for processing is stabilized.

In one embodiment, the depth information acquisition module 1706 is further used to acquire initial depth information of each pixel in an image scheduled for processing in a current posture; acquire the depth information of the focusing region in the current posture; perform fusion and correction processing on the initial depth information and the depth information of the focusing region in the current posture to obtain the first depth information of each pixel in the image scheduled for processing in the current posture. By acquiring the initial depth information of each pixel in the image scheduled for processing in the current posture, and acquiring the depth information of the focusing region in the current posture, two types of depth information with different precision of the same image scheduled for processing in the current posture can be obtained. Local depth information with high precision is applied to each part of the image scheduled for processing, thereby obtaining more accurate depth information of the image scheduled for processing.

In one embodiment, the depth information acquisition module 1706 is further used to determine the focusing region in the current posture, and acquire a corresponding focal length value according to the focusing region; acquire corresponding depth information according to the focal length value, and use the depth information corresponding to the focal length value as the depth information of the focusing region in the current posture. The focal length value corresponding to the focusing region in the current posture is obtained by the preset correspondence between the focusing region and the focal length value, and the depth information corresponding to the focal length value of the lens in the current posture is obtained according to the preset correspondence between the focal length value and the depth information, Thus, the depth information corresponding to the focusing region in the current posture can be obtained indirectly.

In one embodiment, the depth information acquisition module 1706 is further used to acquire a mapping relationship between the focusing region and the focal length value, and acquire the focal length value corresponding to the focusing region according to the mapping relationship. The focal length value corresponding to the focusing region in the current posture can be quickly obtained by using the preset mapping relationship between the focusing region and the focal length value.

In one embodiment, the depth information acquisition module 1706 is further used to acquire a relational mapping table, and acquire the focal length value corresponding to the focusing region from the relational mapping table, wherein the mapping relationship between the focusing region and the focal length value is recorded in the relational mapping table. The focal length value corresponding to the focusing region in the current posture can be obtained quickly and simply through the relational mapping table.

In one embodiment, the depth information obtaining module 1706 is further used to acquire a focusing curve and acquire depth information corresponding to the focal length value from the focusing curve, wherein the focusing curve is a correlation curve between the focal length value and the depth information. The depth information corresponding to the focal length value of the focusing region in the current posture can be quickly and simply obtained by the focusing curve, so that the depth information corresponding to the focusing region in the current posture can be indirectly obtained.

In one embodiment, the depth information includes a depth value, and the depth information acquisition module 1706 is further used to determine one pixel in the image scheduled for processing in the current posture matching each pixel in the focusing region in the current posture; determine a difference between the depth value of the focusing region and an initial depth value of the matched pixel in the image scheduled for processing; determine the first depth information of each pixel in the image scheduled for processing in the current posture according to the difference and the initial depth information of each pixel in the image scheduled for processing in the current posture.

In the image processing apparatus in this embodiment, the difference between the depth value of the focusing region and the initial depth value of the matched pixel in the image scheduled for processing can be determined, and the gap between the depth value of the pixel in the focusing region and the initial depth value of the matched pixel in the image scheduled for processing can be determined. According to the difference, the depth information of a local image within the focusing region and the initial depth information in the image scheduled for processing can be fused to obtain accurate depth information of each pixel in the image scheduled for processing in the current posture, thereby improving the precision of the depth information of the image scheduled for processing.

In one embodiment, the depth information includes a depth value, and the depth information acquisition module 1706 is further used to determine one pixel in the image scheduled for processing in the current posture matching each pixel in the focusing region in the current posture; determine a ratio between the depth value of the focusing region and the initial depth value of the matched pixel in the image scheduled for processing; determine the first depth information of each pixel in the image scheduled for processing in the current posture according to the ratio and the initial depth information of each pixel in the image scheduled for processing in the current posture.

In the image processing apparatus in this embodiment, the ratio between the depth value of the focusing region and the initial depth value of the matched pixel in the image scheduled for processing can be determined, and a difference proportion between the depth value of the pixel of the focusing region and the initial depth values of matching pixels in the image scheduled for processing can be determined. According to the difference proportion, the depth information of the local image of the focusing region and the initial depth information in the image scheduled for processing can be fused to obtain accurate depth information of each pixel in the image scheduled for processing in the current posture, thereby improving accuracy of depth information of the image scheduled for processing.

In one embodiment, the determination module 1708 is further used to acquire a first three-dimensional coordinate corresponding to each pixel in the image scheduled for processing in the current posture; convert the first three-dimensional coordinate into a second three-dimensional coordinate according to the target posture information using a coordinate transformation algorithm to obtain the second depth information of each pixel in the image scheduled for processing in the target posture, wherein the second three-dimensional coordinate is a three-dimensional coordinate corresponding to each pixel in the image scheduled for processing in the target posture. The coordinate transformation algorithm is used to convert the coordinate of each pixel in the image scheduled for processing in the current posture into the corresponding coordinate in the target posture, so that each pixel can be purposefully re-projected to achieve purposeful anti-shake for each pixel.

In one embodiment, the target image determination module 1710 is further used to acquire initial intrinsic information of the camera; acquire a focal length value of the camera in the current posture; update the initial intrinsic information of the camera according to a focal length value of the camera in the current posture to obtain the first intrinsic information of the camera. The real-time focal length value of the camera in the current posture is acquired to update the intrinsic information of the camera, that can solve the problem that real depth information of each pixel of the image cannot be detected, that is caused by using the same focal length value in traditional image processing methods to project each pixel in the image scheduled for processing onto the same unit plane.

Figure 18:
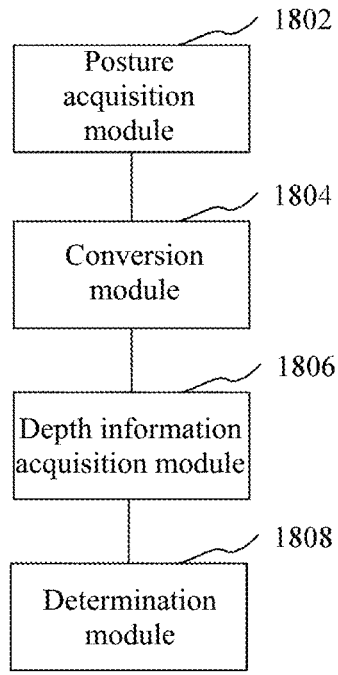
FIG. 18 is a structural block diagram of a depth information acquisition apparatus in one embodiment.

In one embodiment, as shown in FIG. 18, a depth information acquisition apparatus includes:

A posture acquisition module 1802 is used to acquire current posture information of a camera.

A conversion module 1804 is used to convert the current posture information into target posture information.

A depth information acquisition module 1806 is used to acquire the first depth information of each pixel in the image scheduled for processing in the current posture.

A determination module 1808 is used to determine the second depth information of each pixel in the image scheduled for processing in the target posture according to the target posture information and the first depth information of each pixel in the image scheduled for processing in the current posture.

The depth information acquisition device in this embodiment acquires the current posture information of the camera, converts the current posture information into the target posture information, acquires the first depth information of each pixel in the image scheduled for processing in the current posture, and determines the second depth information of each pixel in the image scheduled for processing in the target posture according to the target posture information and the first depth information of each pixel in the image scheduled for processing in the current posture. Thus, accurate depth information of the image scheduled for processing in the target posture can be obtained.

In one embodiment, the conversion module 1804 is used to convert the current posture information into frequency domain space; perform low-pass filtering processing on the current posture information in the frequency domain space; convert the current posture information processed by low-pass filtering into time domain space to obtain the target posture information. It can convert the current posture information into the frequency domain space, make energy of the image scheduled for processing be mainly concentrated in the low frequency, and performs the low-pass filtering on the current posture information in the frequency domain space, that can remove the high-frequency components and retain the low-frequency components, thereby retaining key information in the image scheduled for processing and making information of the image scheduled for processing more intuitive. The current posture information processed by low-pass filtering is converted to the time domain space, the current posture information into the target posture information can be accurately converted, so that the posture of the image scheduled for processing in a stable state can be predicted.

In one embodiment, the posture acquisition module 1802 is used to acquire current angular velocity information of the camera, and convert the current angular velocity information into a first rotation matrix; acquire current acceleration information of the camera, and convert the current acceleration information into a first translation matrix, wherein the first rotation matrix and the first translation matrix are used to represent the current posture information of the camera.

The conversion module 1804 is further used to convert the first rotation matrix and the first translation matrix into the target posture information.

The current angular velocity information is converted into a first rotation matrix, the current acceleration information is converted into a first translation matrix, and the first rotation matrix and the first translation matrix are converted into target posture information, so that the target posture information of the camera can be predicted according to the current posture information of the camera.

In one embodiment, the conversion module 1804 is further used to convert the first rotation matrix and the first translation matrix into frequency domain space;

perform low-pass filtering on each of the first rotation matrix and the first translation matrix in the frequency domain space; convert the first rotation matrix and the first translation matrix processed by low-pass filtering process into the time domain space to obtain the second rotation matrix and the second translation matrix, wherein the second rotation matrix and the second translation matrix are used to represent the target posture information of the camera.

The first rotation matrix and the first translation matrix in the time domain space are converted into the frequency domain space, so that more detailed information of the image scheduled for processing can be obtained, making the image information more intuitive. The first rotation matrix and the first translation matrix processed by the low-pass filtering are converted into the time domain space, so as to obtain the posture information of the camera when the image scheduled for processing is stabilized.

The division of each module in the above image processing apparatus and depth information acquisition apparatus is only used for illustration. In other embodiments, the image processing apparatus may be divided into different modules for requirements to complete all or part of the functionality of the above image processing apparatus and depth information acquisition apparatus.

Figure 19:
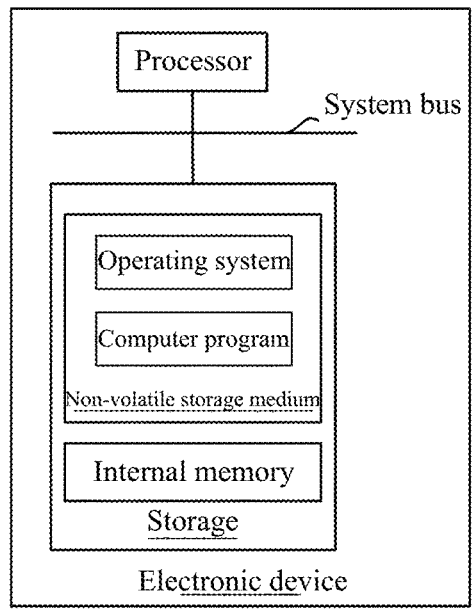
FIG. 19 is a schematic diagram of an internal structure of an electronic device in one embodiment.

FIG. 19 is a schematic diagram of an internal structure of an electronic device in one embodiment. As shown in FIG. 19, the electronic device includes a processor and a memory that are connected via a system bus. The processor is used to provide computing and control capabilities to support the operation of the entire electronic device. The memory may include non-volatile storage medium and internal memory. The nonvolatile storage medium stores an operating system and a computer program. The computer program can be executed by the processor to implement an image processing method provided by the following embodiments. Internal memory provides a cached execution environment for operating system computer programs in a non-volatile storage medium. The electronic device may be a mobile phone, a tablet computer, a personal digital assistant, a wearable device, or the like.

Each module in the image processing apparatus provided in the embodiments of the present disclosure may be implemented in the form of a computer program. The computer program can be run on a terminal or a server. The program modules constituted by the computer program can be stored in the memory of the terminal or the server. When the computer program is executed by the processor, the operations of the methods described in the embodiments of the present disclosure are implemented.

An embodiment of the present disclosure also provides a computer-readable storage medium. One or more non-volatile computer-readable storage mediums including computer-executable instructions, when executed by one or more processors, causes the processors to execute operations of the image processing method and the depth information acquisition method.

A computer program product containing instructions, when run on a computer, causes the computer to execute an image processing method and a depth information acquisition method.

Any reference to memory, storage, database, or other medium as used in embodiments of the present disclosure may include non-volatile and/or volatile memory. Suitable nonvolatile memory may include read-only memory (ROM), programmable ROM (PROM), electrically programmable ROM (EPROM), electrically erasable programmable ROM (EEPROM), or flash memory. Volatile memory may include random access memory (RAM), which acts as external cache memory. By way of illustration and not limitation, RAM is available in various forms such as static RAM (SRAM), dynamic RAM (DRAM), synchronous DRAM (SDRAM), double data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

The above-mentioned embodiments only represent several embodiments of the present disclosure, and the descriptions thereof are relatively specific and detailed, but should not be construed as a limitation on the scope of the patent of the present disclosure. It should be noted that, for those skilled in the art, modifications and improvements can be made and all belong to the protection scope of the present disclosure without departing from the concept of the present disclosure. Therefore, the scope of protection of the patent of the present disclosure shall be subject to the appended claims.

What is claimed is:

1. An image processing method, comprising:
acquiring current posture information of a camera;
converting the current posture information into target posture information;
acquiring first depth information of each pixel in an image scheduled for processing in a current posture, comprising:
acquiring initial depth information of each pixel in the image scheduled for processing in the current posture;
acquiring depth information of a focusing region in the current posture; and
performing fusion and correction processing on the initial depth information and the depth information of the focusing region in the current posture to obtain the first depth information of each pixel in the image scheduled for processing in the current posture;
determining second depth information of each pixel in the image scheduled for processing in a target posture according to the target posture information and the first depth information of each pixel in the image scheduled for processing in the current posture; and
acquiring first intrinsic information of the camera and performing re-projection processing on the image scheduled for processing according to the current posture information, the first depth information, the target posture information, the second depth information, and the first intrinsic information to obtain a target image.

2. The method as claimed in claim 1, wherein the converting the current posture information into the target posture information comprises:
converting the current posture information into frequency domain space;
performing low-pass filtering on the current posture information in the frequency domain space; and
converting the current posture information processed by low-pass filtering into time domain space to obtain the target posture information.

3. The method as claimed in claim 1, wherein the acquiring the current posture information of the camera comprises:
acquiring current angular velocity information of the camera, and converting the current angular velocity information into a first rotation matrix;
acquiring current acceleration information of the camera, and converting the current acceleration information into a first translation matrix, wherein the first rotation matrix and the first translation matrix are configured to represent the current posture information of the camera; and
wherein the converting the current posture information into the target posture information comprises:

converting the first rotation matrix and the first translation matrix into the target posture information.

4. The method as claimed in claim 3, wherein the converting the first rotation matrix and the first translation matrix into the target posture information comprises:
   converting the first rotation matrix and the first translation matrix into frequency domain space;
   performing low-pass filtering on each of the first rotation matrix and the first translation matrix in the frequency domain space; and
   converting the first rotation matrix and the first translation matrix, that are processed by low-pass filtering, into time domain space to obtain a second rotation matrix and a second translation matrix, wherein the second rotation matrix and the second translation matrix are configured to represent the target posture information of the camera.

5. The method as claimed in claim 1, wherein the acquiring the depth information of the focusing region in the current posture comprises:
   determining the focusing region in the current posture, and acquiring a corresponding focal length value according to the focusing region; and
   acquiring corresponding depth information according to the focal length value, and using the depth information corresponding to the focal length value as the depth information of the focusing region in the current posture.

6. The method as claimed in claim 5, wherein the acquiring the corresponding focal length value according to the focusing region comprises:
   acquiring a mapping relationship between the focusing region and the focal length value, and acquiring the focal length value corresponding to the focusing region according to the mapping relationship.

7. The method as claimed in claim 5, wherein the acquiring the corresponding depth information according to the focal length value comprises:
   acquiring a focusing curve, and acquiring the depth information corresponding to the focal length value from the focusing curve, wherein the focusing curve is a correlation curve between the focal length value and the depth information corresponding to the focal length value.

8. The method as claimed in claim 1, wherein the depth information of the focusing region in the current posture comprises a depth value, and the performing fusion and correction processing on the initial depth information and the depth information of the focusing region in the current posture to obtain the first depth information of each pixel in the image scheduled for processing in the current posture comprises:
   determining a pixel in the image scheduled for processing in the current posture matching each pixel in the focusing region in the current posture;
   determining a difference or ratio between the depth value of the focusing region and an initial depth value of the matched pixel in the image scheduled for processing; and
   determining the first depth information of each pixel in the image scheduled for processing in the current posture according to the difference or ratio and the initial depth information of each pixel in the image scheduled for processing in the current posture.

9. An electronic device, comprising a processor; and a memory configured to store a computer program which, when executed by the processor, causes the processor to perform a method comprising:
   acquiring current posture information of a camera;
   converting the current posture information into target posture information;
   acquiring first depth information of each pixel in an image scheduled for processing in a current posture, comprising:
      acquiring initial depth information of each pixel in the image scheduled for processing in the current posture;
      acquiring depth information of a focusing region in the current posture; and
      performing fusion and correction processing on the initial depth information and the depth information of the focusing region in the current posture to obtain the first depth information of each pixel in the image scheduled for processing in the current posture; and
   determining second depth information of each pixel in the image scheduled for processing in a target posture according to the target posture information and the first depth information of each pixel in the image scheduled for processing in the current posture.

10. The electronic device as claimed in claim 9, wherein the converting the current posture information into the target posture information comprises:
    converting the current posture information into frequency domain space;
    performing low-pass filtering on the current posture information in the frequency domain space; and
    converting the current posture information processed by low-pass filtering into time domain space to obtain the target posture information.

11. The electronic device as claimed in claim 9, wherein the acquiring the current posture information of the camera comprises:
    acquiring current angular velocity information of the camera, and converting the current angular velocity information into a first rotation matrix;
    acquiring current acceleration information of the camera, and converting the current acceleration information into a first translation matrix, wherein the first rotation matrix and the first translation matrix are configured to represent the current posture information of the camera; and
    wherein the converting the current posture information into the target posture information comprises:
    converting the first rotation matrix and the first translation matrix into the target posture information.

12. The electronic device as claimed in claim 11, wherein the converting the first rotation matrix and the first translation matrix into the target posture information comprises:
    converting the first rotation matrix and the first translation matrix into frequency domain space;
    performing low-pass filtering on each of the first rotation matrix and the first translation matrix in the frequency domain space; and
    converting the first rotation matrix and the first translation matrix, that are processed by low-pass filtering, into time domain space to obtain a second rotation matrix and a second translation matrix, wherein the second rotation matrix and the second translation matrix are configured to represent the target posture information of the camera.

13. The electronic device as claimed in claim 9, wherein the acquiring the depth information of the focusing region in the current posture comprises:

determining the focusing region in the current posture, and acquiring a corresponding focal length value according to the focusing region; and acquiring corresponding depth information according to the focal length value, and using the depth information corresponding to the focal length value as the depth information of the focusing region in the current posture.

14. The electronic device as claimed in claim 13, wherein the acquiring the corresponding focal length value according to the focusing region comprises:

acquiring a mapping relationship between the focusing region and the focal length value, and acquiring the focal length value corresponding to the focusing region according to the mapping relationship.

15. The electronic device as claimed in claim 13, wherein the acquiring the corresponding depth information according to the focal length value comprises:

acquiring a focusing curve, and acquiring the depth information corresponding to the focal length value from the focusing curve, wherein the focusing curve is a correlation curve between the focal length value and the depth information corresponding to the focal length value.

16. The electronic device as claimed in claim 9, wherein the depth information of the focusing region in the current posture comprises a depth value, and the performing fusion and correction processing on the initial depth information and the depth information of the focusing region in the current posture to obtain the first depth information of each pixel in the image scheduled for processing in the current posture comprises:

determining a pixel in the image scheduled for processing in the current posture matching each pixel in the focusing region in the current posture;

determining a difference or ratio between the depth value of the focusing region and an initial depth value of the matched pixel in the image scheduled for processing; and determining the first depth information of each pixel in the image scheduled for processing in the current posture according to the difference or ratio and the initial depth information of each pixel in the image scheduled for processing in the current posture.

17. A non-transitory computer-readable storage medium having a computer program stored thereon, the computer program, when executed by a processor, causes the processor to perform a method comprising:

acquiring current posture information of a camera;

converting the current posture information into target posture information;

acquiring first depth information of each pixel in an image scheduled for processing in a current posture, comprising:

acquiring initial depth information of each pixel in the image scheduled for processing in the current posture;

acquiring depth information of a focusing region in the current posture; and performing fusion and correction processing on the initial depth information and the depth information of the focusing region in the current posture to obtain the first depth information of each pixel in the image scheduled for processing in the current posture;

determining second depth information of each pixel in the image scheduled for processing in a target posture according to the target posture information and the first depth information of each pixel in the image scheduled for processing in the current posture; and acquiring first intrinsic information of the camera and performing re-projection processing on the image scheduled for processing according to the current posture information, the first depth information, the target posture information, the second depth information, and the first intrinsic information to obtain a target image.

18. The non-transitory computer-readable storage medium as claimed in claim 17, wherein the acquiring the current posture information of the camera comprises:

acquiring current angular velocity information of the camera, and converting the current angular velocity information into a first rotation matrix;

acquiring current acceleration information of the camera, and converting the current acceleration information into a first translation matrix, wherein the first rotation matrix and the first translation matrix are configured to represent the current posture information of the camera; and wherein the converting the current posture information into the target posture information comprises:

converting the first rotation matrix and the first translation matrix into the target posture information.

* * * * *